(12) United States Patent
Hansbrough et al.

(10) Patent No.: US 11,687,541 B2
(45) Date of Patent: Jun. 27, 2023

(54) SYSTEM AND METHOD FOR MOBILE DEVICE RENDERING ENGINE FOR USE WITH A DATA ANALYTICS ENVIRONMENT

(71) Applicant: ORACLE INTERNATIONAL CORPORATION, Redwood Shores, CA (US)

(72) Inventors: Reginald Hansbrough, Celina, TX (US); Adrian Niebla, Guadalajara (MX); Christian Lindor, Culiacán (MX)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/476,250

(22) Filed: Sep. 15, 2021

(65) Prior Publication Data

US 2022/0107948 A1 Apr. 7, 2022

Related U.S. Application Data

(60) Provisional application No. 63/086,562, filed on Oct. 1, 2020.

(51) Int. Cl.
| | |
|---|---|
| *G06F 16/00* | (2019.01) |
| *G06F 16/2458* | (2019.01) |
| *G06F 16/28* | (2019.01) |
| *G06T 15/80* | (2011.01) |
| *G06T 15/00* | (2011.01) |
| *G06F 16/2457* | (2019.01) |

(52) U.S. Cl.
CPC ...... *G06F 16/2465* (2019.01); *G06F 16/2457* (2019.01); *G06F 16/285* (2019.01); *G06T 15/005* (2013.01); *G06T 15/80* (2013.01); *G06F 2216/03* (2013.01)

(58) Field of Classification Search
None
See application file for complete search history.

(56) References Cited

U.S. PATENT DOCUMENTS

| | | |
|---|---|---|
| 9,754,392 B2 | 9/2017 | Fernandez |
| 10,706,599 B2 | 7/2020 | Prophete |
| (Continued) | | |

*Primary Examiner* — Anhtai V Tran
(74) *Attorney, Agent, or Firm* — Tucker Ellis LLP

(57) ABSTRACT

In accordance with an embodiment, described herein is a system and method for providing a mobile device application and rendering engine, for use with a data analytics environment in generating interactive visualizations of large amounts of data, with high frame rates. The mobile device can receive, from a data analytics server, a data payload describing data points associated with data analytics visualizations, and employs shader objects or routines (shaders) in combination with a graphics processing unit (GPU), to render data visualizations with high resolution, including support for features such as drill-downs. User interaction with a visualization can be interpreted by the rendering engine as transformations or deltas of an original presentation, and communicated to a shader to cause the GPU to render an updated visualization. A hierarchical data model enables data visualizations to be layered and brought forward or backward within the overall presentation in a multi-dimensional exploratory manner.

18 Claims, 22 Drawing Sheets

(56) References Cited

U.S. PATENT DOCUMENTS

| | | |
|---|---|---|
| 10,917,587 B2 | 2/2021 | Hansbrough |
| 11,308,665 B2 | 4/2022 | Kazem |
| 2014/0247271 A1* | 9/2014 | Fernandez ............ G06T 15/005 345/589 |
| 2015/0282175 A1* | 10/2015 | Dai ................... H04W 72/0453 370/329 |
| 2018/0365873 A1* | 12/2018 | Prophete ............... G06T 11/206 |
| 2021/0157475 A1 | 5/2021 | Hansbrough |
| 2021/0241507 A1* | 8/2021 | Kazem ................. G06F 40/237 |

* cited by examiner

SYSTEM AND METHOD FOR MOBILE DEVICE RENDERING ENGINE FOR USE WITH A DATA ANALYTICS ENVIRONMENT

CLAIM OF PRIORITY

This application claims the benefit of priority to U.S. Provisional Patent Application titled "MOBILE DEVICE RENDERING ENGINE FOR USE WITH A DATA ANALYTICS WAREHOUSE", Application No. 63/086,562, filed Oct. 1, 2020; which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to computer data analytics, and computer-based methods of providing business intelligence or other data, and are particularly related to a mobile device rendering engine for use with data analytics environments.

BACKGROUND

Generally described, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example, an Oracle Fusion Applications environment or other type of enterprise software application or data environment; or within the context of a software-as-a-service (SaaS) or cloud environment, such as, for example, an Oracle Analytics Cloud or Oracle Cloud Infrastructure environment, or other type of cloud environment.

However, a traditional approach to rendering data visualizations, for example as may be provided by a desktop-computer/application environment, wherein a chart data is generated by a data analytics server and then rendered according to various charting shapes by the desktop-computer/application, does not lend itself well to mobile device environments, wherein the mobile device may have a lower-power central processing unit (CPU) or limited memory resources.

SUMMARY

In accordance with an embodiment, described herein is a system and method for providing a mobile device application and rendering engine, for use with a data analytics environment in generating interactive visualizations of large amounts of data, with high frame rates. The mobile device can receive, from a data analytics server, a data payload describing data points associated with data analytics visualizations, and employs shader objects or routines (shaders) in combination with a graphics processing unit (GPU), to render data visualizations with high resolution, including support for features such as drill-downs. User interaction with a visualization can be interpreted by the rendering engine as transformations or deltas of an original presentation, and communicated to a shader to cause the GPU to render an updated visualization. A hierarchical data model enables data visualizations to be layered and brought forward or backward within the overall presentation in a multi-dimensional exploratory manner.

DETAILED DESCRIPTION

Figure 1:
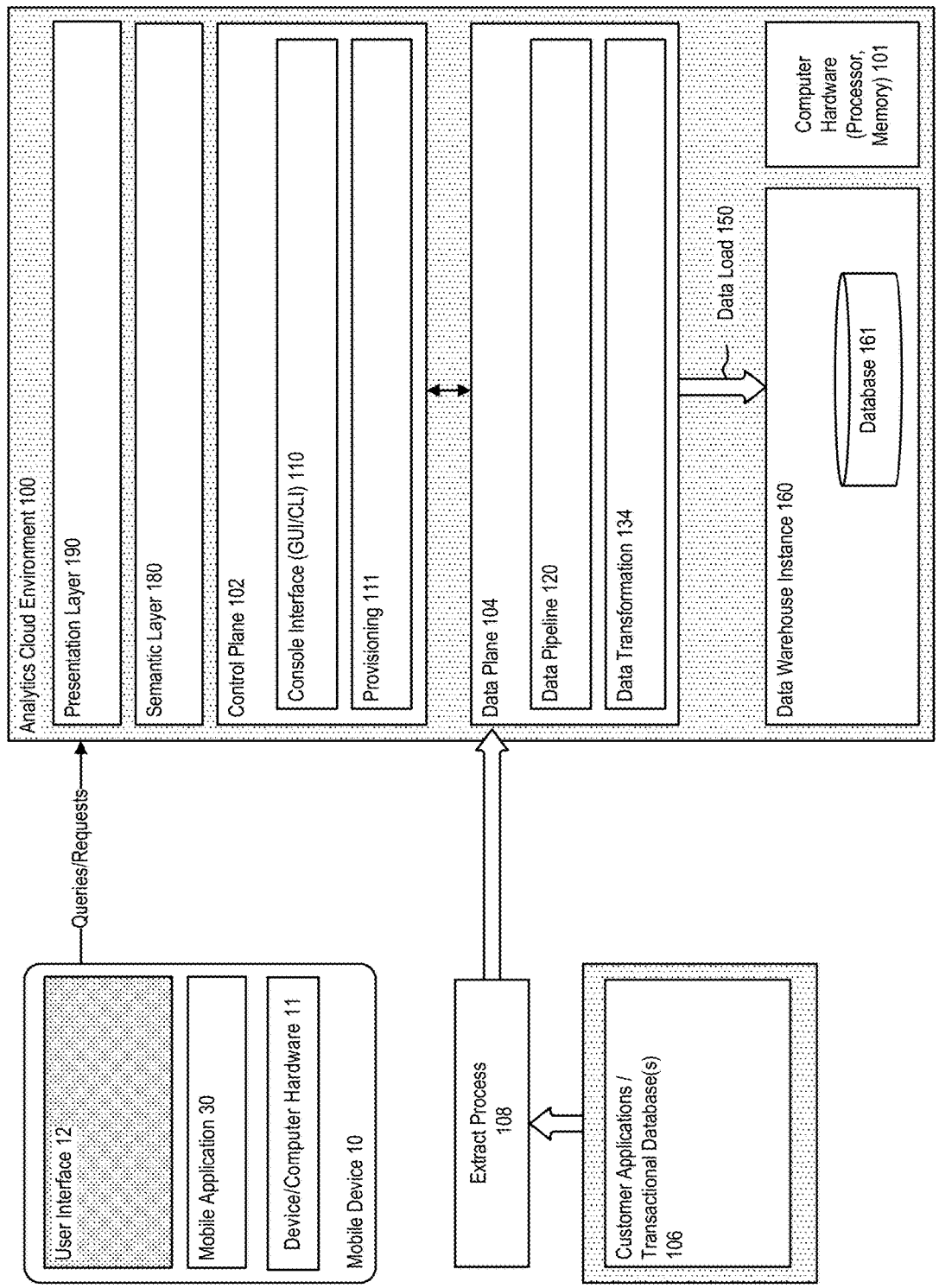
FIG. 1 illustrates an example data analytics or analytics cloud environment, in accordance with an embodiment.

As described above, within an organization, data analytics enables the computer-based examination or analysis of large amounts of data, in order to derive conclusions or other information from that data; while business intelligence tools provide an organization's business users with information describing their enterprise data in a format that enables those business users to make strategic business decisions.

Increasingly, there is an interest in developing software applications that leverage the use of data analytics within the context of an organization's enterprise software application or data environment, such as, for example, an Oracle Fusion Applications environment or other type of enterprise software application or data environment; or within the context of a software-as-a-service (SaaS) or cloud environment, such as, for example, an Oracle Analytics Cloud or Oracle Cloud Infrastructure environment, or other type of cloud environment.

However, a traditional approach to rendering data visualizations, for example as may be provided by a desktop-computer/application environment, wherein a chart data is generated by a data analytics server and then rendered according to various charting shapes by the desktop-computer/application, does not lend itself well to mobile device environments, wherein the mobile device may have a lower-power central processing unit (CPU) or limited memory resources.

To support the providing of business intelligence or other analytics information in mobile device environments, in accordance with an embodiment, described herein is a system and method for providing a mobile device application and rendering engine, for use with a data analytics environment in generating interactive visualizations of large amounts of data, with high frame rates.

The mobile device can receive, from a data analytics server, a data payload describing data points associated with data analytics visualizations, and employs shader objects or routines (shaders) in combination with a graphics processing unit (GPU), to render data visualizations with high resolution, including support for features such as drill-downs.

User interaction with a visualization can be interpreted by the rendering engine as transformations or deltas of an original presentation, and communicated to a shader to cause the GPU to render an updated visualization.

A hierarchical data model enables data visualizations to be layered and brought forward or backward within the overall presentation in a multi-dimensional exploratory manner.

Enterprise Data Analytics Environment

In accordance with an embodiment, an analytics environment, for example an Oracle Fusion Analytics Warehouse (FAW) environment, or NetSuite Analytics Warehouse (NAW) environment, enables data analytics within the context of an organization's enterprise software application or data environment, or a software-as-a-service or other type of cloud environment; and supports the development of computer-executable software analytic applications or providing of data analytics or business intelligence.

For example, in accordance with an embodiment, a data warehouse environment or component, such as, for example, an Oracle Autonomous Data Warehouse (ADVV), Oracle Autonomous Data Warehouse Cloud (ADWC), or other type of data warehouse environment or component adapted to store large amounts of data, can provide a central repository for storage of data collected by one or more business applications.

In accordance with an embodiment, the data warehouse environment or component can be provided as a multi-dimensional database that employs online analytical processing (OLAP) or other techniques to generate business-related data from multiple different sources of data.

In accordance with an embodiment, the analytic applications environment allows customers (tenants) to develop computer-executable software analytic applications for use with a BI component, such as, for example, an Oracle Business Intelligence Applications (OBIA) environment, or other type of BI component adapted to examine large amounts of data sourced either by the customer (tenant) itself, or from multiple third-party entities. As another example, an analytics environment can be used to pre-populate a reporting interface of a data warehouse instance with relevant metadata describing business-related data objects in the context of various business productivity software applications, for example, to include predefined dashboards, key performance indicators (KPIs), or other types of reports.

FIG. 1 illustrates an example data analytics or analytics cloud environment, in accordance with an embodiment.

The example shown and described in FIG. 1 is provided for purposes of illustrating an example of one type of data analytics environment that can utilize a query execution debugger as described herein. In accordance with other embodiments and examples, the query execution debugger approach described herein can be used with other types of data analytics, database, or data warehouse environments.

As illustrated in FIG. 1, in accordance with an embodiment, an analytics cloud environment 100 can be provided by, or otherwise operate at, a computer system having a computer hardware (e.g., processor, memory) 101, and including one or more software components operating as a control plane 102, and a data plane 104, and providing access to a data warehouse, data warehouse instance 160 (database 161).

In accordance with an embodiment, the components and processes illustrated in FIG. 1, and as further described herein with regard to various other embodiments, can be provided as software or program code executable by a computer system or other type of processing device. For example, in accordance with an embodiment, the components and processes described herein can be provided by a cloud computing system, or other suitably-programmed computer system.

In accordance with an embodiment, the control plane operates to provide control for cloud or other software products offered within the context of a SaaS or cloud environment, such as, for example, an Oracle Analytics Cloud or Oracle Cloud Infrastructure environment, or other type of cloud environment. For example, in accordance with an embodiment, the control plane can include a console interface 110 that enables access by a client computer or mobile device 10 having a device hardware 12, user interface 16, and application 30, under control of a customer (tenant) and/or provisioning component 111.

In accordance with an embodiment, the console interface can enable access by a customer (tenant) operating a graphical user interface (GUI) and/or a command-line interface (CLI) or other interface; and/or can include interfaces for use by providers of the SaaS or cloud environment and its customers (tenants). For example, in accordance with an embodiment, the console interface can provide interfaces that allow customers to provision services for use within their SaaS environment, and to configure those services that have been provisioned.

In accordance with an embodiment, a customer (tenant) can request the provisioning of a customer schema 164 within the data warehouse. The customer can also supply, via the console interface, a number of attributes associated with the data warehouse instance, including required attributes (e.g., login credentials), and optional attributes (e.g., size, or speed). The provisioning component can then provision the requested data warehouse instance, including a customer schema of the data warehouse; and populate the data warehouse instance with the appropriate information supplied by the customer.

In accordance with an embodiment, the provisioning component can also be used to update or edit a data warehouse instance, and/or an ETL process that operates at the data plane, for example, by altering or updating a requested frequency of ETL process runs, for a particular customer (tenant).

In accordance with an embodiment, the data plane API can communicate with the data plane. For example, in accordance with an embodiment, provisioning and configuration changes directed to services provided by the data plane can be communicated to the data plane via the data plane API.

In accordance with an embodiment, the data plane can include a data pipeline or process layer 120 and a data transformation layer 134, that together process operational or transactional data from an organization's enterprise software application or data environment, such as, for example, business productivity software applications provisioned in a customer's (tenant's) SaaS environment. The data pipeline or process can include various functionality that extracts transactional data from business applications and databases that are provisioned in the SaaS environment, and then load a transformed data into the data warehouse.

In accordance with an embodiment, the data transformation layer can include a data model, such as, for example, a knowledge model (KM), or other type of data model, that the system uses to transform the transactional data received from business applications and corresponding transactional databases provisioned in the SaaS environment, into a model format understood by the analytic applications environment. The model format can be provided in any data format suited for storage in a data warehouse. In accordance with an embodiment, the data plane can also include a data and configuration user interface 130, and mapping and configuration database 132.

In accordance with an embodiment, the data warehouse can include a default analytic applications schema (referred to herein in accordance with some embodiments as an analytic warehouse schema) 162 and, for each customer (tenant) of the system, a customer schema as described above.

In accordance with an embodiment, the data plane is responsible for performing extract, transform, and load (ETL) operations, including extracting transactional data from an organization's enterprise software application or data environment, such as, for example, business productivity software applications and corresponding transactional databases offered in a SaaS environment, transforming the extracted data into a model format, and loading the transformed data into a customer schema of the data warehouse.

For example, in accordance with an embodiment, each customer (tenant) of the environment can be associated with their own customer tenancy within the data warehouse, that is associated with their own customer schema; and can be additionally provided with read-only access to the analytic applications schema, which can be updated by a data pipeline or process, for example, an ETL process, on a periodic or other basis.

In accordance with an embodiment, a data pipeline or process can be scheduled to execute at intervals (e.g., hourly/daily/weekly) to extract transactional data from an enterprise software application or data environment, such as, for example, business productivity software applications and corresponding transactional databases 106 that are provisioned in the SaaS environment.

In accordance with an embodiment, an extract process 108 can extract the transactional data, whereupon extraction the data pipeline or process can insert extracted data into a data staging area, which can act as a temporary staging area for the extracted data. The data quality component and data protection component can be used to ensure the integrity of the extracted data. For example, in accordance with an embodiment, the data quality component can perform validations on the extracted data while the data is temporarily held in the data staging area.

In accordance with an embodiment, when the extract process has completed its extraction, the data transformation layer can be used to begin the transform process, to transform the extracted data into a model format to be loaded into the customer schema of the data warehouse.

As described above, in accordance with an embodiment, the data pipeline or process can operate in combination with the data transformation layer to transform data into the model format. The mapping and configuration database can store metadata and data mappings that define the data model used by data transformation. The data and configuration user interface (UI) can facilitate access and changes to the mapping and configuration database.

In accordance with an embodiment, the data transformation layer can transform extracted data into a format suitable for loading into a customer schema of data warehouse, for example according to the data model as described above. During the transformation, the data transformation can perform dimension generation, fact generation, and aggregate generation, as appropriate. Dimension generation can include generating dimensions or fields for loading into the data warehouse instance.

In accordance with an embodiment, after transformation of the extracted data, the data pipeline or process can execute a warehouse load procedure 150, to load the transformed data into the customer schema of the data warehouse instance. Subsequent to the loading of the transformed data into customer schema, the transformed data can be analyzed and used in a variety of additional business intelligence processes.

Different customers of a data analytics environment may have different requirements with regard to how their data is classified, aggregated, or transformed, for purposes of providing data analytics or business intelligence data, or developing software analytic applications. In accordance with an embodiment, to support such different requirements, a semantic layer 180 can include data defining a semantic model of a customer's data; which is useful in assisting users in understanding and accessing that data using commonly-understood business terms; and provide custom content to a presentation layer 190.

In accordance with an embodiment, the presentation layer can enable access to the data content using, for example, a software analytic application, user interface, dashboard, key performance indicators (KPI's); or other type of report or interface as may be provided by products such as, for example, Oracle Analytics Cloud, or Oracle Analytics for Applications.

Mobile Device Rendering Engine for Data Analytics

As described above, a mobile device may have a lower-power CPU or limited memory resources, when compared with a desktop environment, and as such may not be well suited to the traditional approach to rendering data visualizations.

To support the providing of business intelligence or other analytics information in mobile device environments, in accordance with an embodiment, described herein is a system and method for providing a mobile device application (app) and rendering engine, for use with a data analytics environment in generating interactive visualizations of large amounts of data, with high frame rates.

In accordance with an embodiment, examples of the various types of mobile applications (apps) that can benefit from the rendering approach described herein include Oracle Synopsis, and Oracle Day-by-Day, which can be installed on and used to provide data analytics on a mobile device.

Using such an application, a user can, for example, quickly and easily turn data into meaningful data visualizations without a detailed knowledge of data exploration or data science; import spreadsheet data and receive instant data visualization; change an initial visualization, for example, from a donut chart to a bar chart—based on the complexity of the data, the app displays the data in an appropriate chart; select specific data from a spreadsheet for analysis, or change the format of the data, or transform the data; share an analysis using other apps on the mobile device; import data from an Oracle Analytics Cloud data set; scan printed tables with the device camera; or perform other features provided by the app.

In accordance with an embodiment, generally described a mobile device can be provided as a mobile computing device or other computer-type device adapted for portable use. Examples of mobile devices include laptops, notebook computers, smartphones, and tablets, which are generally adapted to communicate with one or more server systems via a network, for example the Internet.

In accordance with an embodiment, a mobile device includes a user interface provided at a display screen, which displays software-generated depictions or views into a set of data, examples of which include windows, dialog boxes, displayed tables, or other graphical features or views.

In accordance with an embodiment, particular examples of displayable views can include KPI's and cards, which provide categories of content and associated enterprise data and/or analytics. An interactive visualization may be any visualization that includes or is displayed in association with one or more user interface controls enabling a user interaction with the visualization and/or underlying data, for example by the user able to drill-down, request a change in chart type, pivoting or filtering the data according to particular criteria.

In accordance with an embodiment, the underlying data that is used to generate a visualization for display at the mobile device can represent objects, database dimensions, features, or other data characteristics, for example as provided by a server within an analytics cloud environment, In accordance with an embodiment, access to various sets of data by a particular user or their mobile device can be controlled in accordance with user authentication or other login rights or data permissions associated with the user, including for example, any access permissions provided to a user's mobile device to enable access by that user/device to the particular data at the analytics cloud environment.

Figure 2:
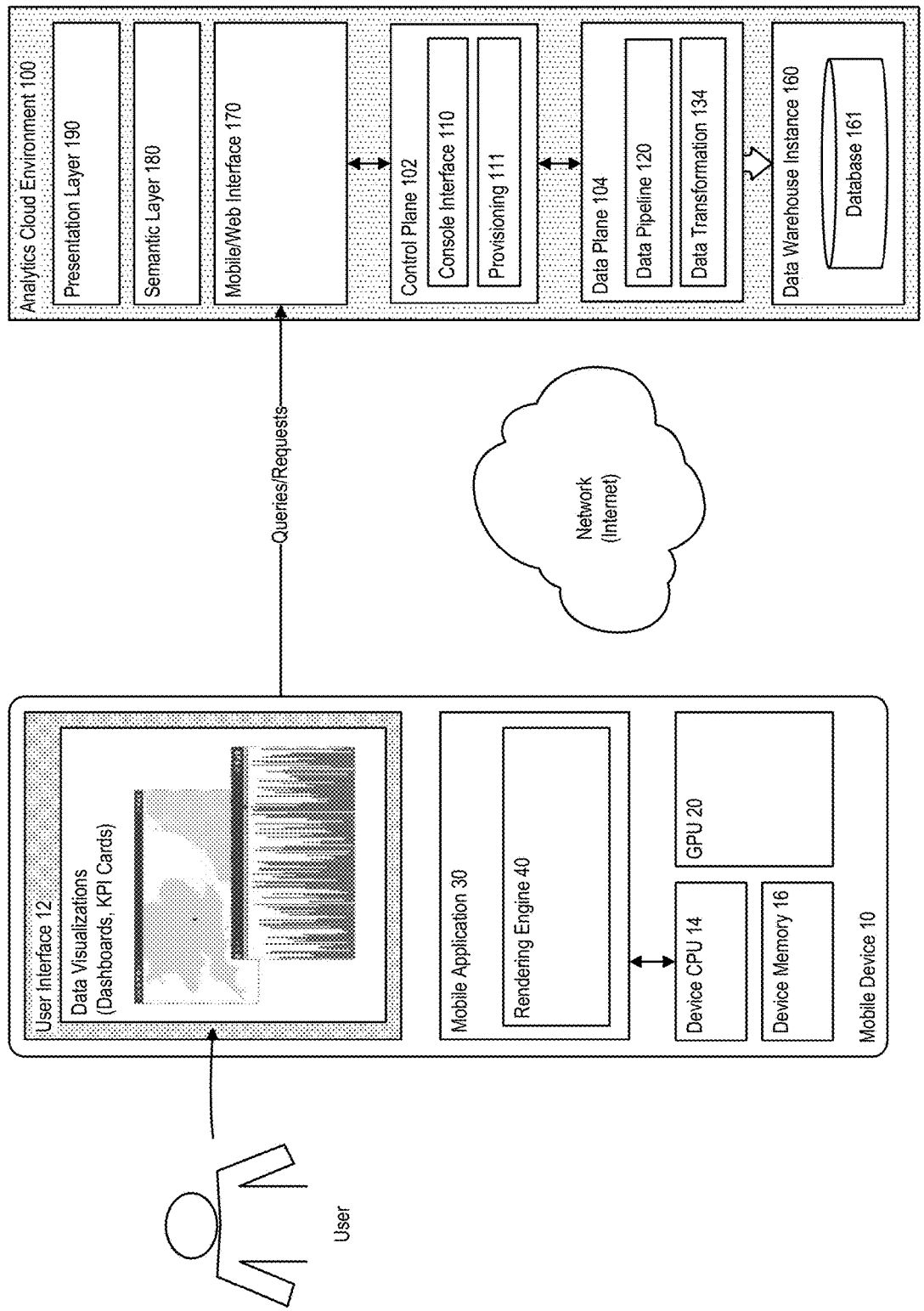
FIG. 2 illustrates the use of a mobile device together with a mobile application to access a data analytics or analytics cloud environment, in accordance with an embodiment.

FIG. 2 illustrates the use of a mobile device together with a mobile application to access a data analytics or analytics cloud environment, in accordance with an embodiment.

As illustrated in FIG. 2, in accordance with an embodiment, a mobile device 10 that includes a user interface 12, device CPU 14, device memory 16, graphics processing unit (GPU) 20 having a GPU memory 24, and mobile application 30 having a rendering engine 40, can be used to access the analytic environment via a mobile/web interface 170 provided by the environment.

Figure 3:
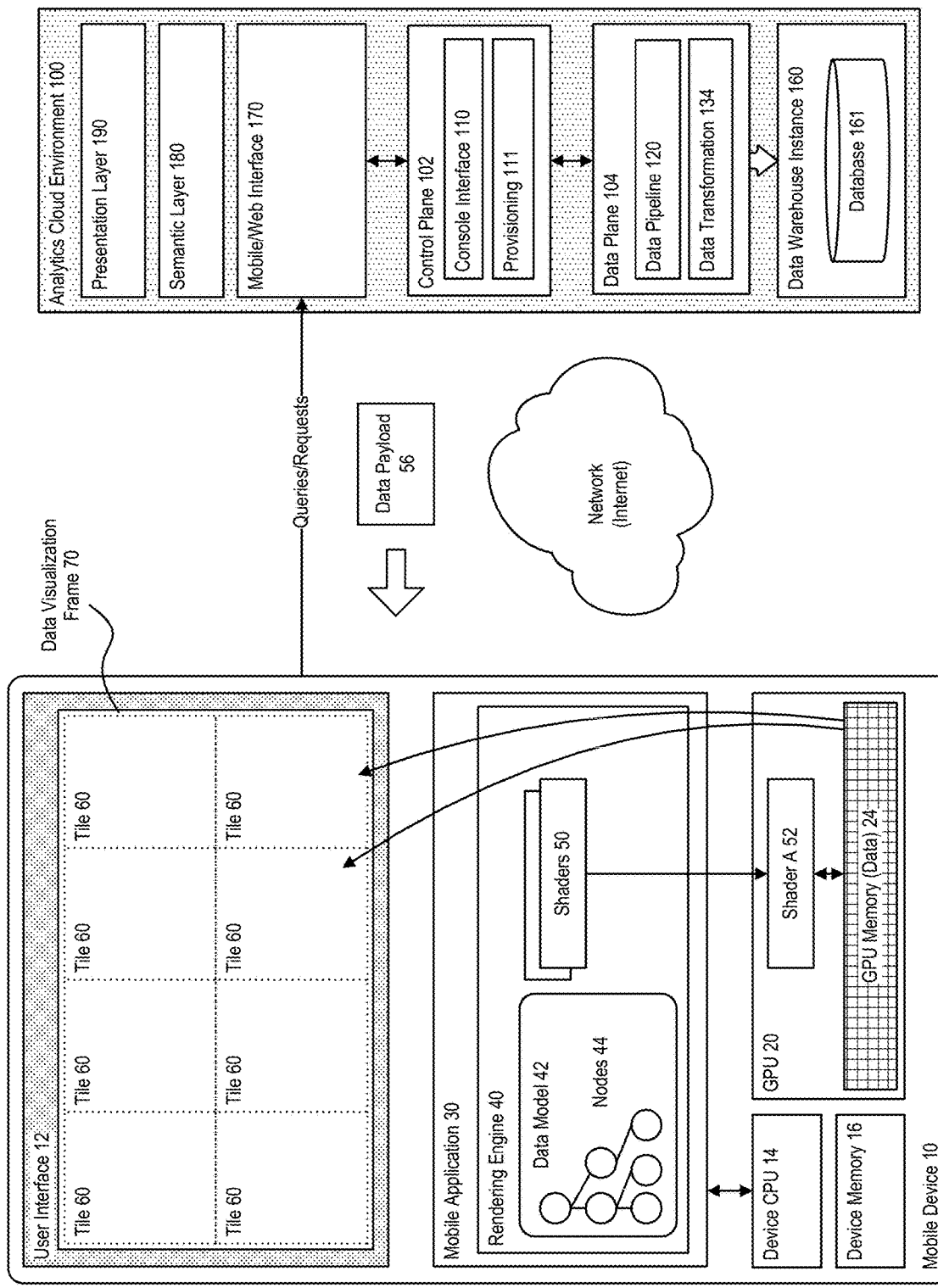
FIG. 3 further illustrates the use of a mobile device and application that includes a rendering engine, to access a data analytics or analytics cloud environment, in accordance with an embodiment.

FIG. 3 further illustrates the use of a mobile device and application that includes a rendering engine, to access a data analytics or analytics cloud environment, in accordance with an embodiment.

In accordance with an embodiment, the mobile device can receive, from a data analytics server, a data payload describing data points associated with data analytics visualizations, and employs shader objects or routines (shaders) in combination with a graphics processing unit (GPU), to render data visualizations with high resolution, including support for features such as drill-downs.

For example, as illustrated in FIG. 3, in accordance with an embodiment, the mobile device is adapted to receive a data payload 56 from an analytics cloud environment 100, for visualization at the mobile device.

In accordance with an embodiment, the mobile device's GPU is well-suited for parallel data processing. For example, in order to provide an enjoyable experience for the user, the system using the GPU can provide a display of visualizations at 60 frames-per-second (fps), including a million or more data points within each visualization frame.

In accordance with an embodiment, the approach to providing data analytics visualizations as described herein leverages techniques originally adapted for use in gaming environments, for example by offloading visual display operations from the device CPU to the device GPU where possible, to increase the ability of the system to generate fluid visualizations.

In accordance with an embodiment, a hierarchical data model enables data visualizations to be layered and brought forward or backward within the overall presentation in a multi-dimensional exploratory manner.

For example, as illustrated in FIG. 3, in accordance with an embodiment, the rendering engine of the mobile device associates a hierarchical data model 42 having nodes 44, with the data payload.

Subsequently, in accordance with an embodiment, in response to a request to generate a visualization of a data payload, for display at a user interface of the mobile device, the rendering engine determines according to the hierarchical data model, one or more shaders 50 for use with the data payload to create the appropriate visualization.

In accordance with an embodiment, each shader can use a different process or algorithm to perform its particular responsibility of generating a portion of a visualization. For example, each shader can operate as a program template for the GPU that instructs the GPU how to draw a particular chart shape as part of a visualization.

In accordance with an embodiment, each shader can be implemented as software code in a programming language such as, for example C++, GLSL, or another type of code or language that communicates directly with the GPU. This can provide performance advantages over desktop applications that may be implemented in programming languages such as, e.g., Java, and that generally communicate via the CPU. When compiled for use with a GPU, as part of its operation to draw or render a particular chart shape as part of a visualization, the shader instructs the GPU to draw a plurality of (many) triangles on the user interface, which then make up the overall visualization.

For example, in accordance with an embodiment, the rendering engine can use a plurality of OpenGL (glUseProgram) program routines in association with shaders, an example of which is illustrated in Example 1 below, to render each frame within a visualization, by installing a program object to which shader objects can be attached, compiled, and rendered:

```
glUseProgram(program);
glActiveTexture(GL_TEXTURE5);
glBindTexture(GL_TEXTURE_2D, tile->getTexture( ));
glBindVertexArray(VAO);
auto frameBounds = Bounds<double>(frame.x, frame.y, frame.width,
frame.height);
glm::mat4 trans = frameTransform * tile->
    getBounds( ).getRelativePosition(frameBounds).getTransform( ) ;
glUniformMatrix4fv(transformUniform, 1, GL_FALSE, &trans[0] [0]);
glUniform1i(textureUniform, 5);
glDrawArrays(GL_TRIANGLE_STRIP, 0, 4);
glBindTexture(GL_TEXTURE_2D, 0);
glUseProgram(0);
glActiveTexture(GL_TEXTURE0);
checkGlError("glActiveTexture");
```

The above example object is provided by way of example to illustrate the techniques described herein, in accordance with an example embodiment. In accordance with other embodiments, other examples of objects can be provided.

As further illustrated in FIG. 3, in accordance with an embodiment, a shader 52 is used together with the data payload as stored in the GPU to generate a set of tiles 60 comprising a visualization frame 70, for display at the user interface.

In accordance with an embodiment, each frame can be considered a point in time, or a view at a particular point in time, of an overall visualization. To provide the user with a fluid visualization in the manner of an animation, the system can generate approximately 60 frames-per-second (fps), each of which is rendered by the GPU and one or more shaders as appropriate, using the above approach.

In accordance with an embodiment, the data received from the server as a payload is stored in a first data structure, with the visualization associated with that data stored or provided in a second/different data structure. Each visualization type (e.g., map, bar chart) can be associated with a particular shader; and each visualization can have multiple tiles, for which its associated shader is called to render and/or update those tiles within a frame.

In accordance with an embodiment, the visualization data structure is initially empty. Upon receipt of the data payload from the server, the rendering engine can pass the data model associated with the data payload, to an appropriate shader, to populate the visualization; the shader can then operate with the GPU to render the data points as frames, at a required resolution.

In accordance with an embodiment, a user interaction with a visualization can be interpreted by the rendering engine as transformations or deltas of an original presentation, and communicated to a shader to cause the GPU to render an updated visualization.

In accordance with an embodiment, in response to interaction by a user with the displayed visualization, for example to zoom or pan the displayed visualization, the rendering engine can determine a transformation or delta associated with the interaction and the display of the data payload.

For example, in accordance with an embodiment, the first time the rendering engine passes a visualization such as a chart, for display at the user interface, a minimum and maximum value can be associated with that data. From then, in response to interactions by the user, the system can use a matrix transformation to move between, e.g., zoomed levels, or to pan the visualization. Each interaction that results in a transformation is passed to the shader and GPU to update the data visualization on the render call, without needing to re-fetch the data itself from the analytics cloud environment.

For example, in accordance with an embodiment, with a bar chart visualization displaying millions of data points, when a user interacts with the bar chart to zoom, pan or otherwise redraw the data; the rendering engine can interpret the user's actions as translations to the original data model, and instruct the shader and GPU to create the new frame based on a transformation applied to that data model and associated data.

In accordance with an embodiment, interactions associated with a move within the data model from one branch of nodes to another may result in a transformation such as a delta zoom or pan; or alternatively a change in the actual type of visualization being rendered. With each subsequent interaction or transformation, the world space associated with the visualization can remain the same, with the interactions resulting in the shader and GPU creating new frames within that workspace, but without having to reload the data stored in the GPU.

In accordance with an embodiment, the rendering engine uses the shader together with the data payload as stored in the GPU and the transformation or delta, to update a visualization frame for display at the user interface, responsive to the interaction, to generate an updated set of tiles 80 comprising an (updated) visualization frame 90, for display at the user interface.

In accordance with an embodiment, the mobile device can continue to receive interactions with the displayed visualization; wherein the rendering engine uses the shader together with the data payload as stored in the GPU, to continue to update the visualization frame for display at the user interface.

In accordance with an embodiment, the hierarchical data model as described above provides an understanding of different data containers, and enables drill-down to nodes of different dimensions. For example, in accordance with an embodiment, a top level of the hierarchical data model tree may be associated with a map display with countries, state, and city notes, while a lower level of the hierarchical data model tree may be associated with a bar chart display. Since the data is fetched and remains available within the mobile device, the system can quickly generate visualizations that traverse the tree by rendering the data differently via transformations of the data and corresponding instructions to the appropriate shaders and GPU.

Mobile Device Interaction with Data Analytics Environment

In accordance with various embodiments, examples are described below which illustrate the use of a mobile device application with a data analytics environment (for example, an analytics cloud environment), in accordance with an embodiment.

FIGS. 4-8 further illustrates the use of a mobile device and application that includes a rendering engine, to access a data analytics or analytics cloud environment, in accordance with an embodiment.

Figure 4:
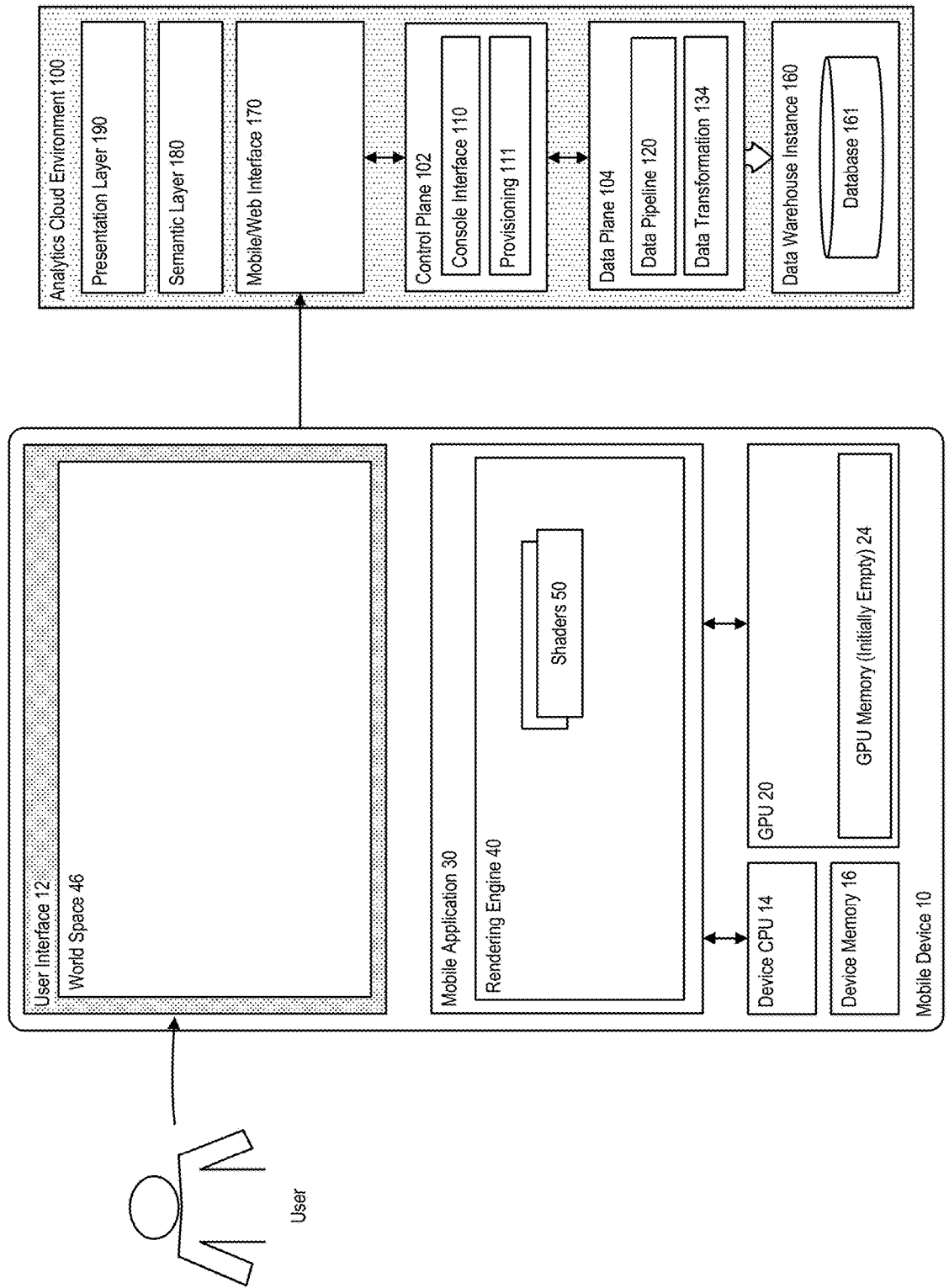
FIG. 4 further illustrates the use of a mobile device and application that includes a rendering engine, to access a data analytics or analytics cloud environment, in accordance with an embodiment.

As illustrated in FIG. 4, in accordance with an embodiment, a mobile device is provided that includes a graphics processing unit (GPU), and a mobile application adapted to receive a data payload from an analytics cloud environment for visualization at the mobile device. Initially, the user interface can be associated with a graphics world space 46 that operates as a coordinate system for generating data visualizations, and will be subsequently populated with data visualizations, generated by the GPU in response to the data payload received from the analytics cloud environment.

Figure 5:
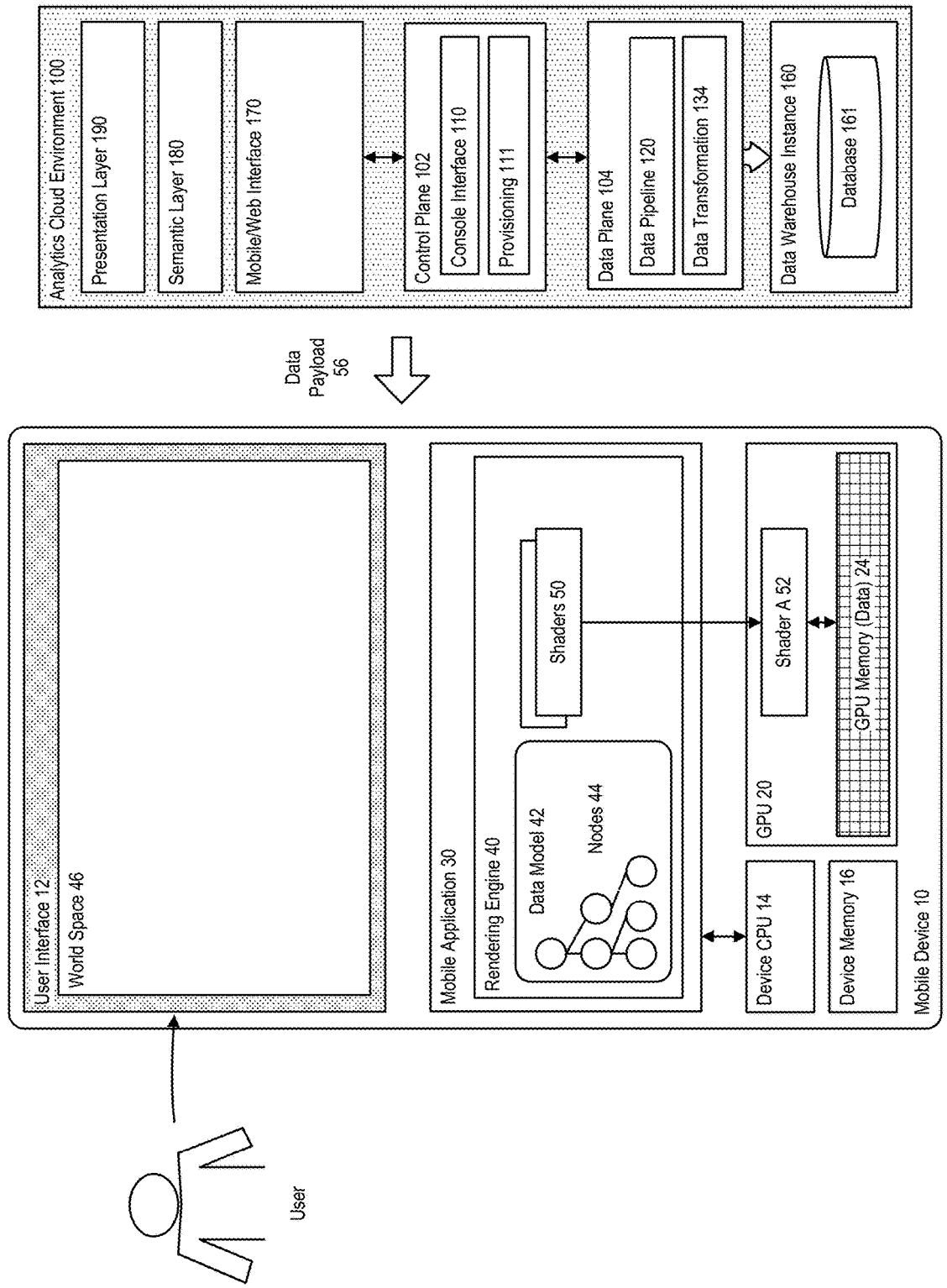
FIG. 5 further illustrates the use of a mobile device and application that includes a rendering engine, to access a data analytics or analytics cloud environment, in accordance with an embodiment.

As illustrated in FIG. 5, in accordance with an embodiment, a rendering engine of the mobile device associates a hierarchical data model with the data payload.

Figure 6:
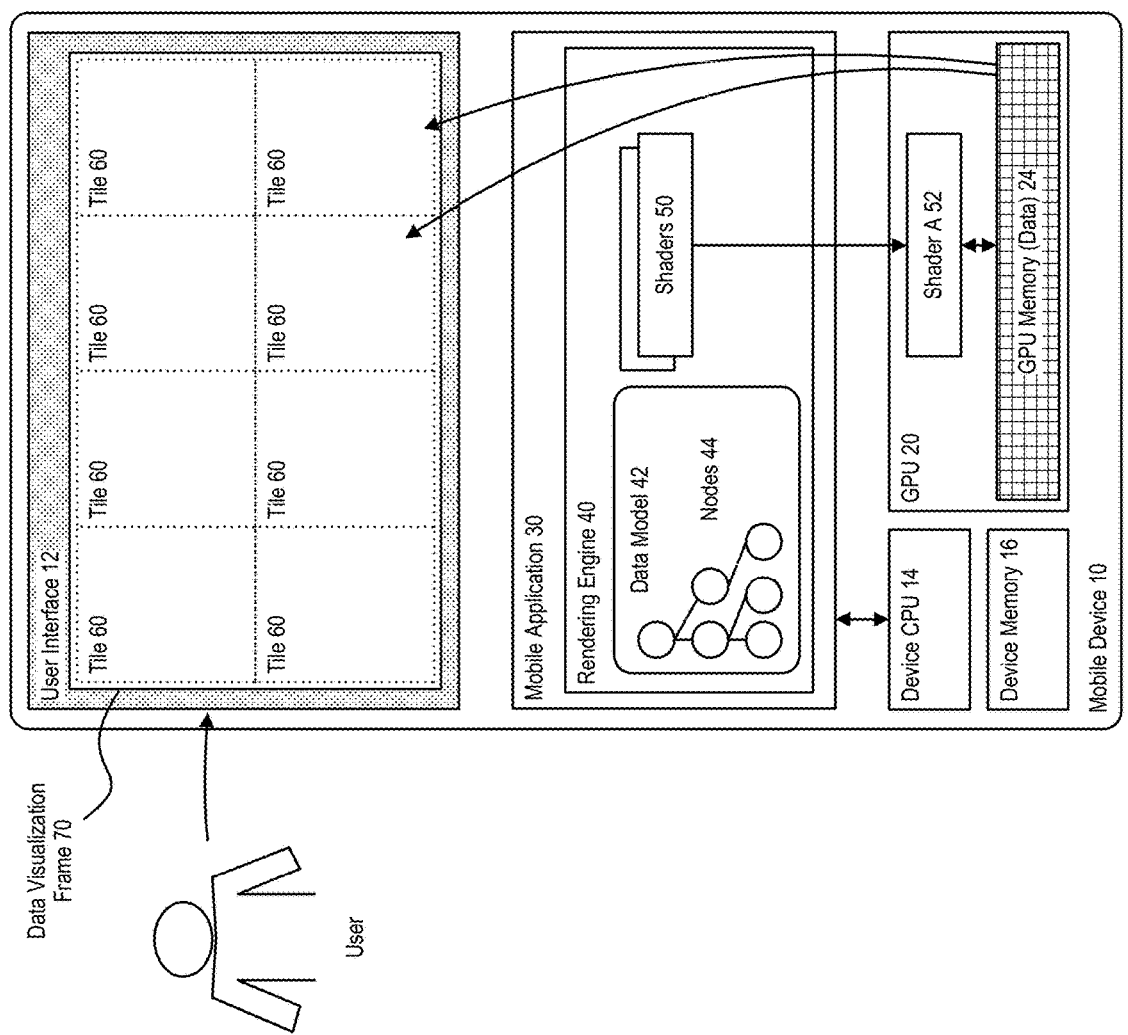
FIG. 6 further illustrates the use of a mobile device and application that includes a rendering engine, to access a data analytics or analytics cloud environment, in accordance with an embodiment.

As illustrated in FIG. 6, in accordance with an embodiment, in response to a request to generate a visualization for display at a user interface of the mobile device, the rendering engine determines according to the hierarchical data model, one or more shaders for use with the data payload to create the visualization. A shader is used together with the data payload as stored in the GPU to generate a visualization frame for display at the user interface.

Figure 7:
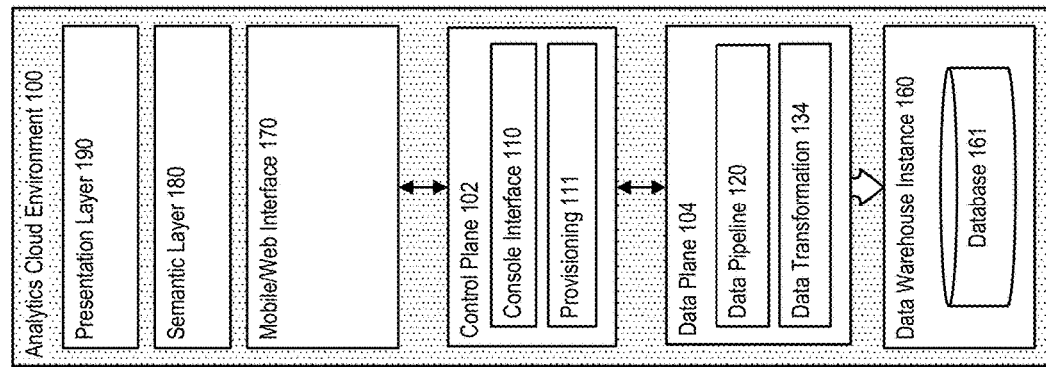
FIG. 7 further illustrates the use of a mobile device and application that includes a rendering engine, to access a data analytics or analytics cloud environment, in accordance with an embodiment.
Figure 7:
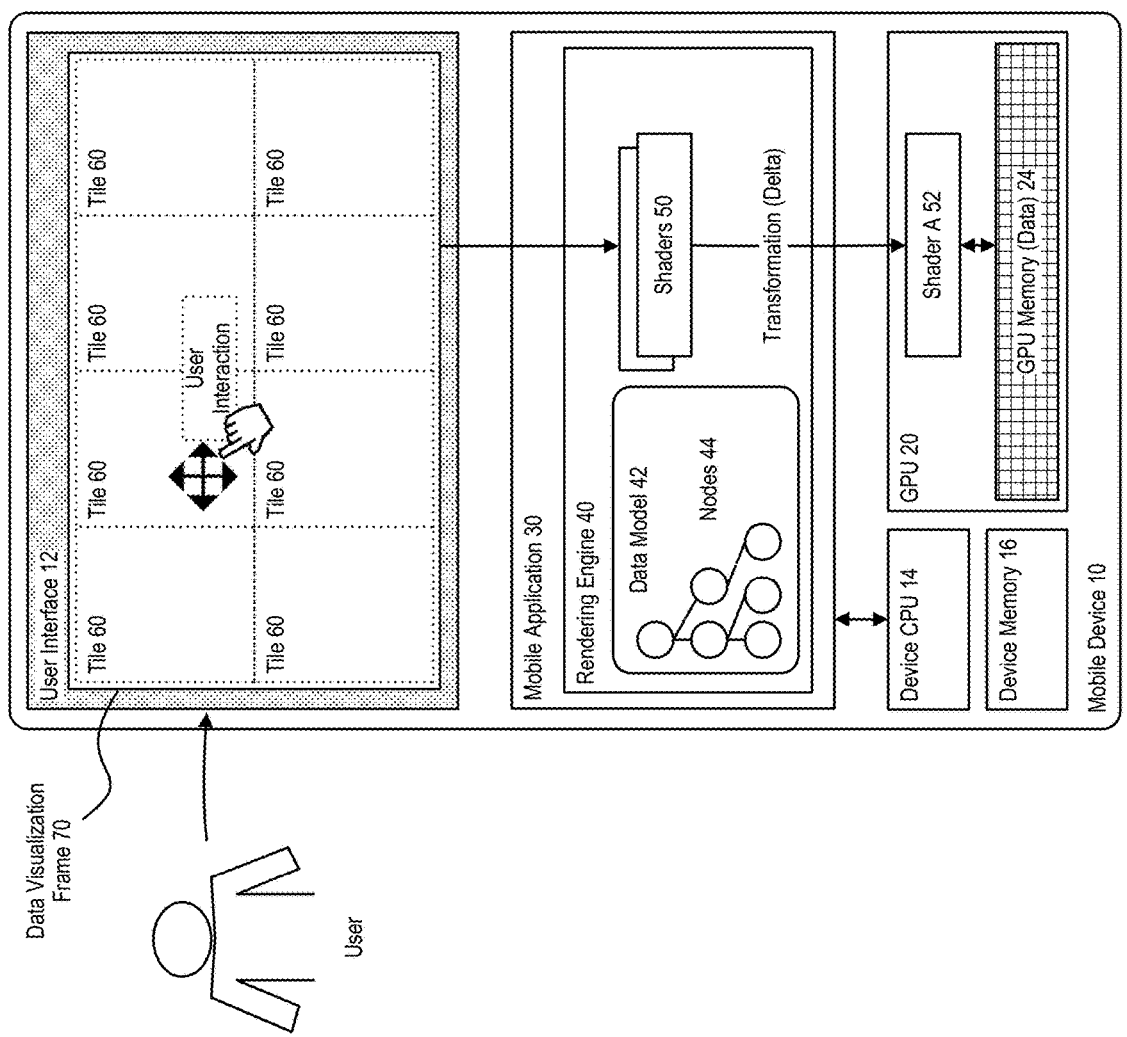

As illustrated in FIG. 7, in accordance with an embodiment, in response to interaction with the displayed visualization, the rendering engine can determine a transformation or delta associated with the display of the data payload.

Figure 8:
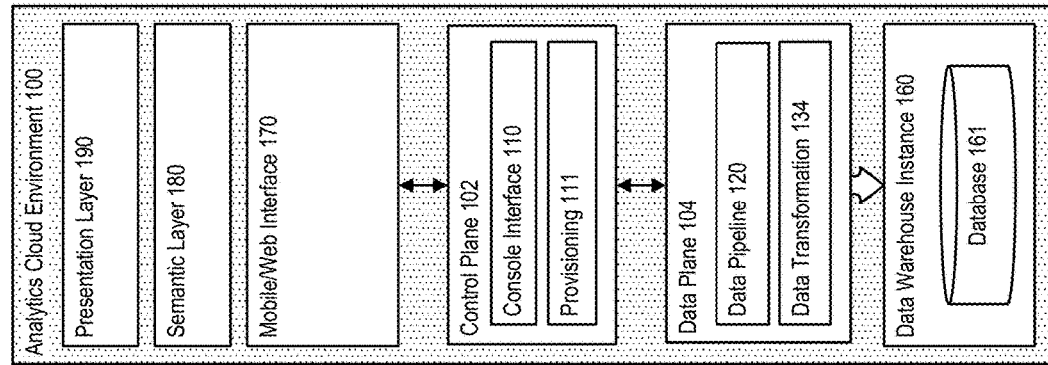
FIG. 8 further illustrates the use of a mobile device and application that includes a rendering engine, to access a data analytics or analytics cloud environment, in accordance with an embodiment.
Figure 8:
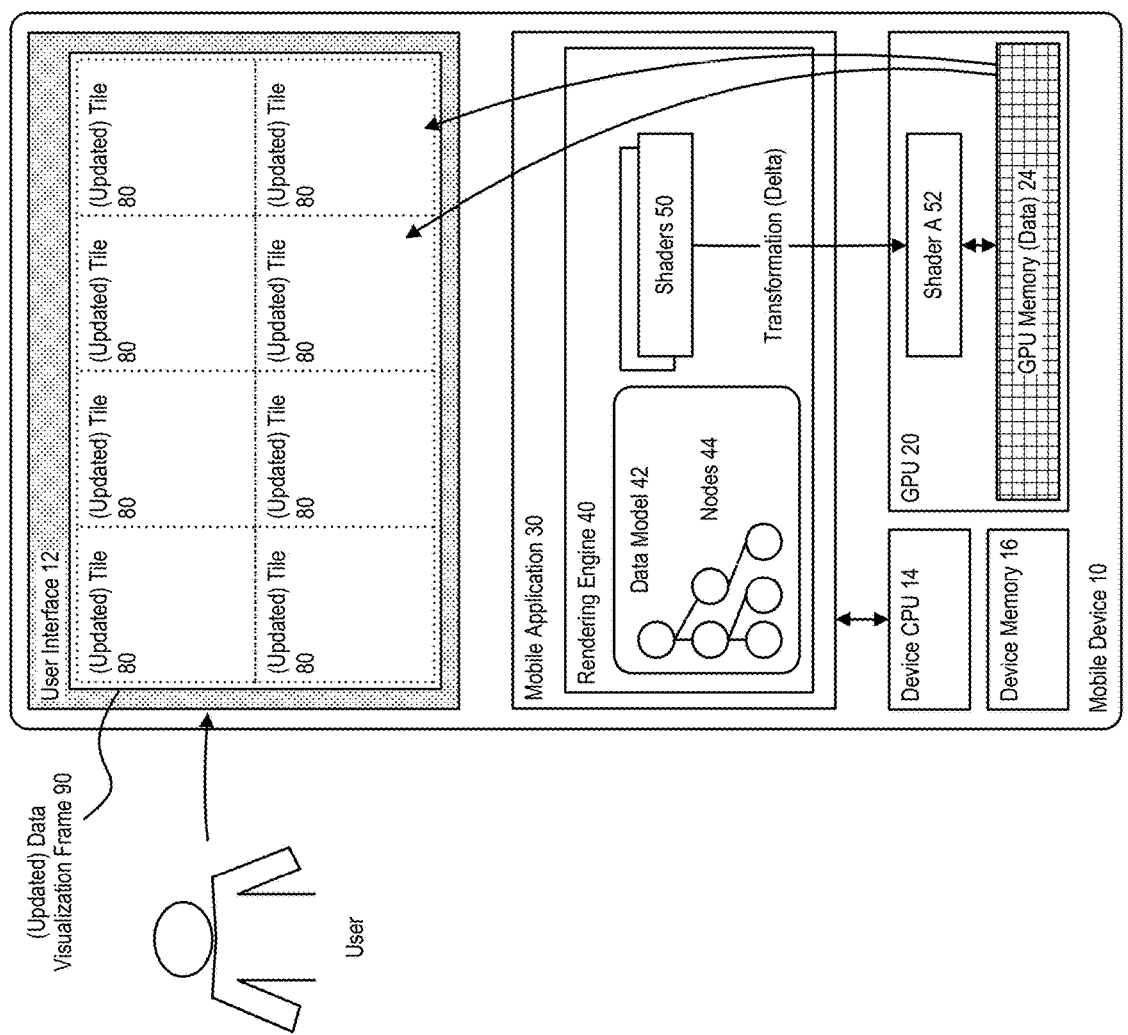
Figure 9:
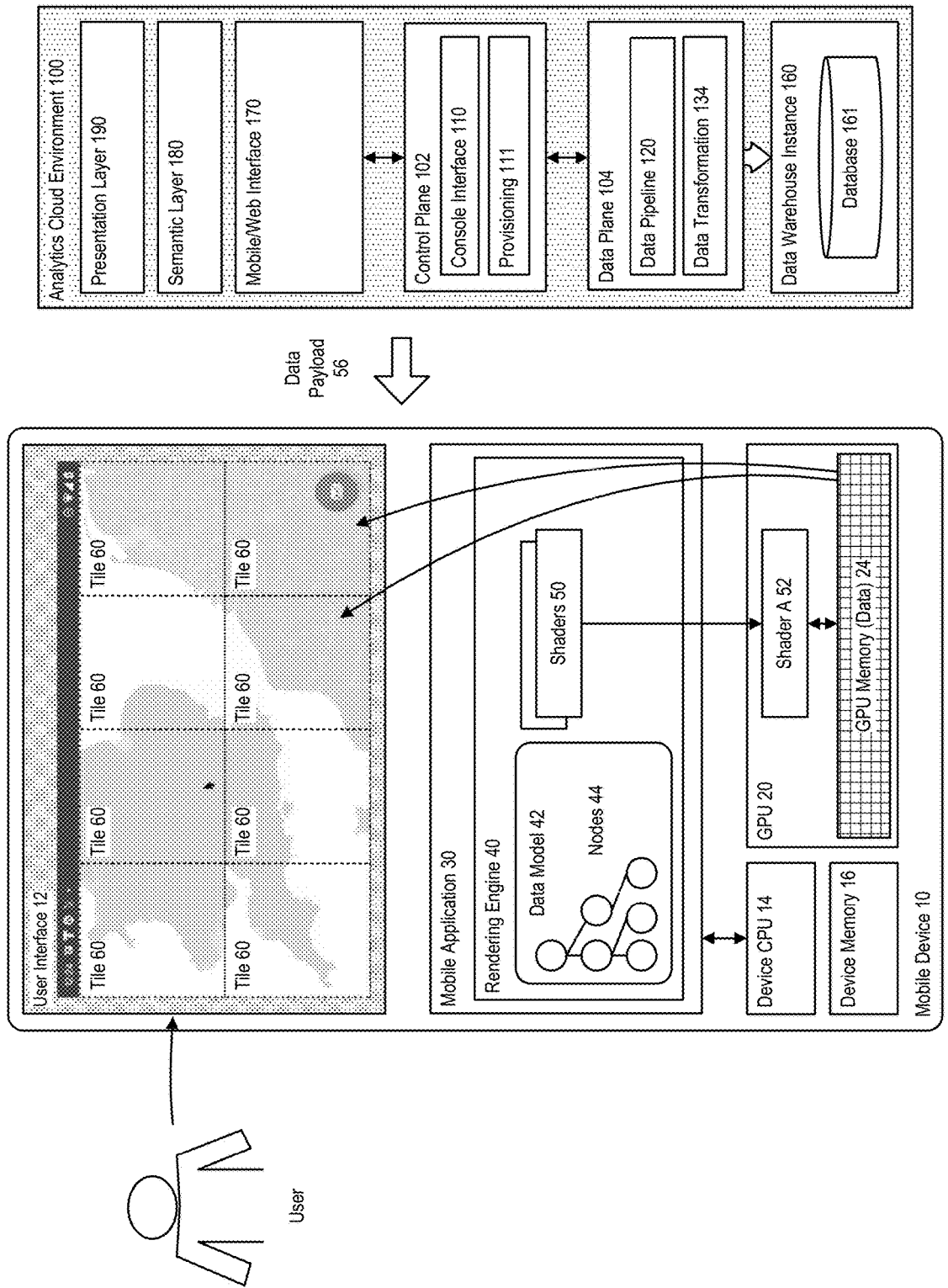
FIG. 9 illustrates an example use of a mobile device and application that includes a rendering engine, to access a data analytics or analytics cloud environment, in accordance with an embodiment.
Figure 10:
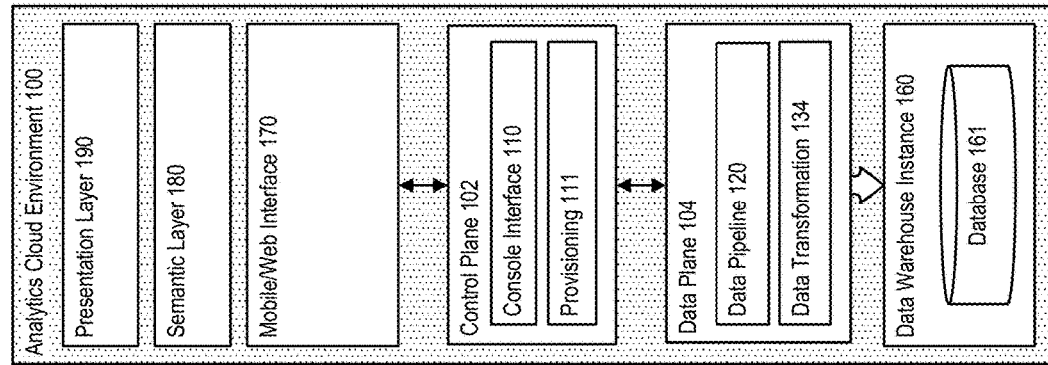
FIG. 10 further illustrates an example use of a mobile device and application that includes a rendering engine, to access a data analytics or analytics cloud environment, in accordance with an embodiment.
Figure 10:
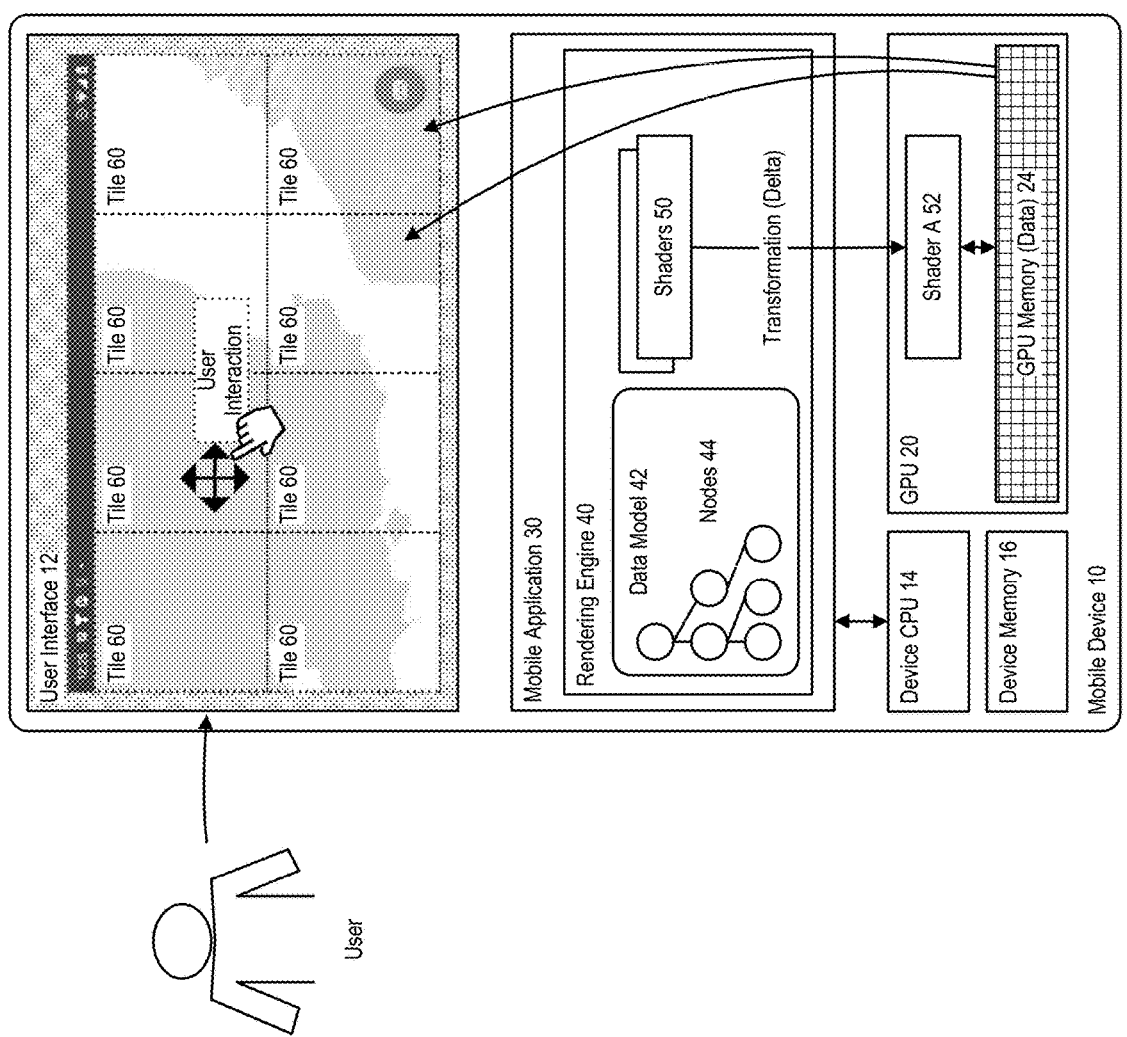
Figure 11:
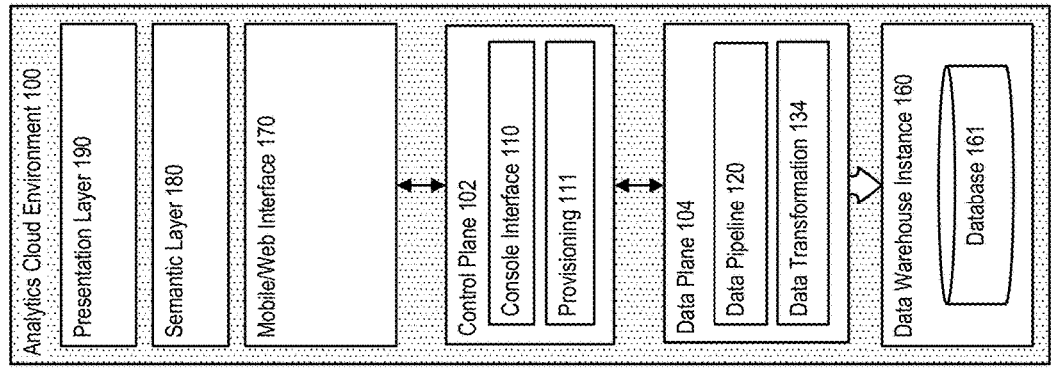
FIG. 11 further illustrates an example use of a mobile device and application that includes a rendering engine, to access a data analytics or analytics cloud environment, in accordance with an embodiment.
Figure 11:
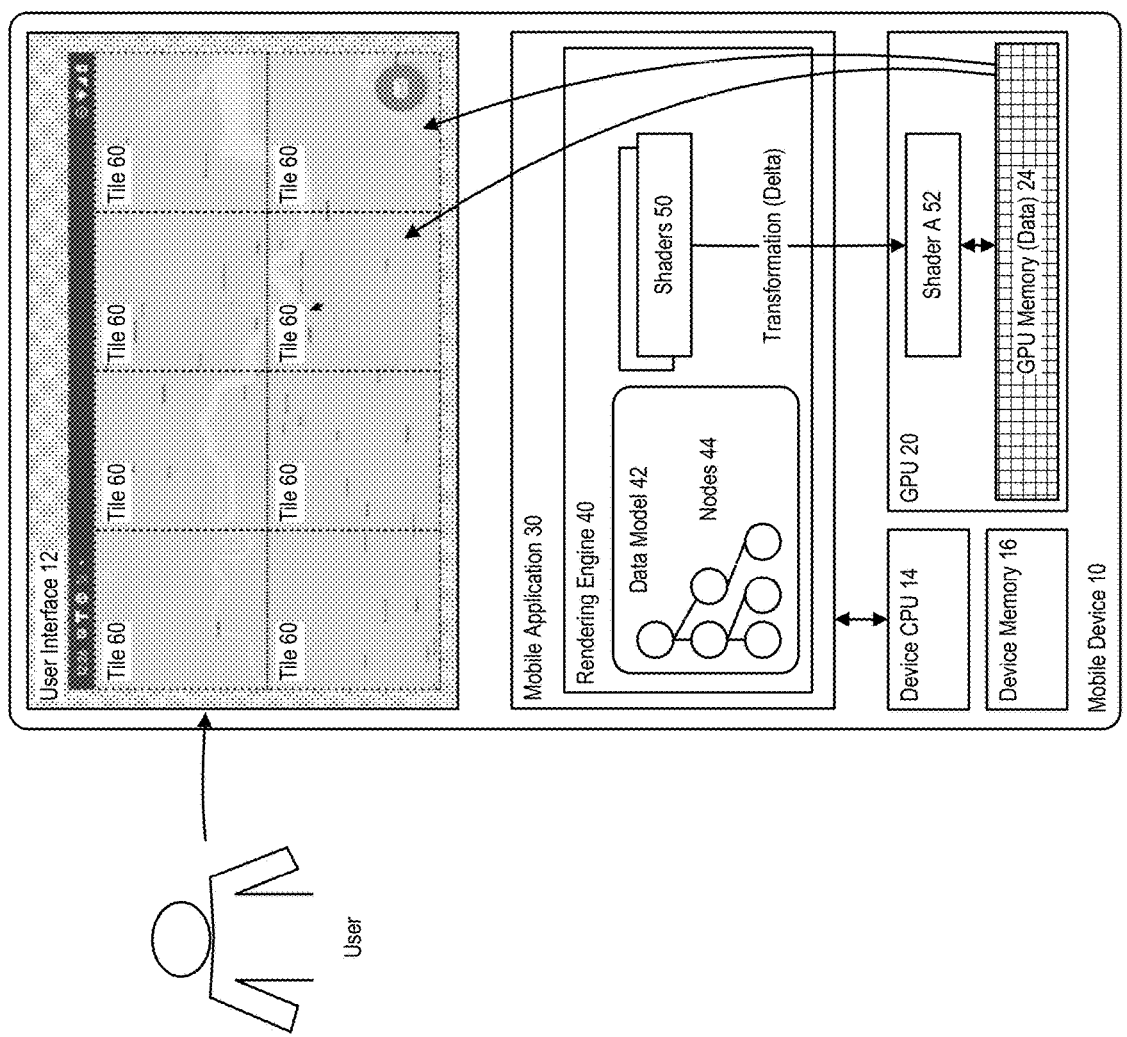
Figure 12:
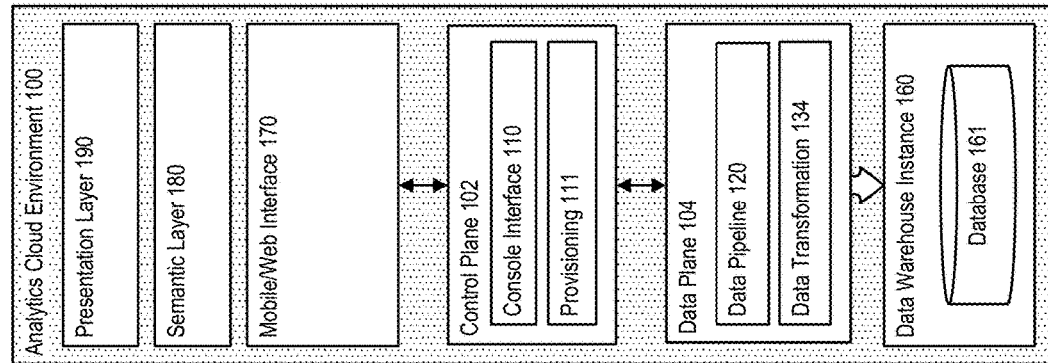
FIG. 12 further illustrates an example use of a mobile device and application that includes a rendering engine, to access a data analytics or analytics cloud environment, in accordance with an embodiment.
Figure 12:
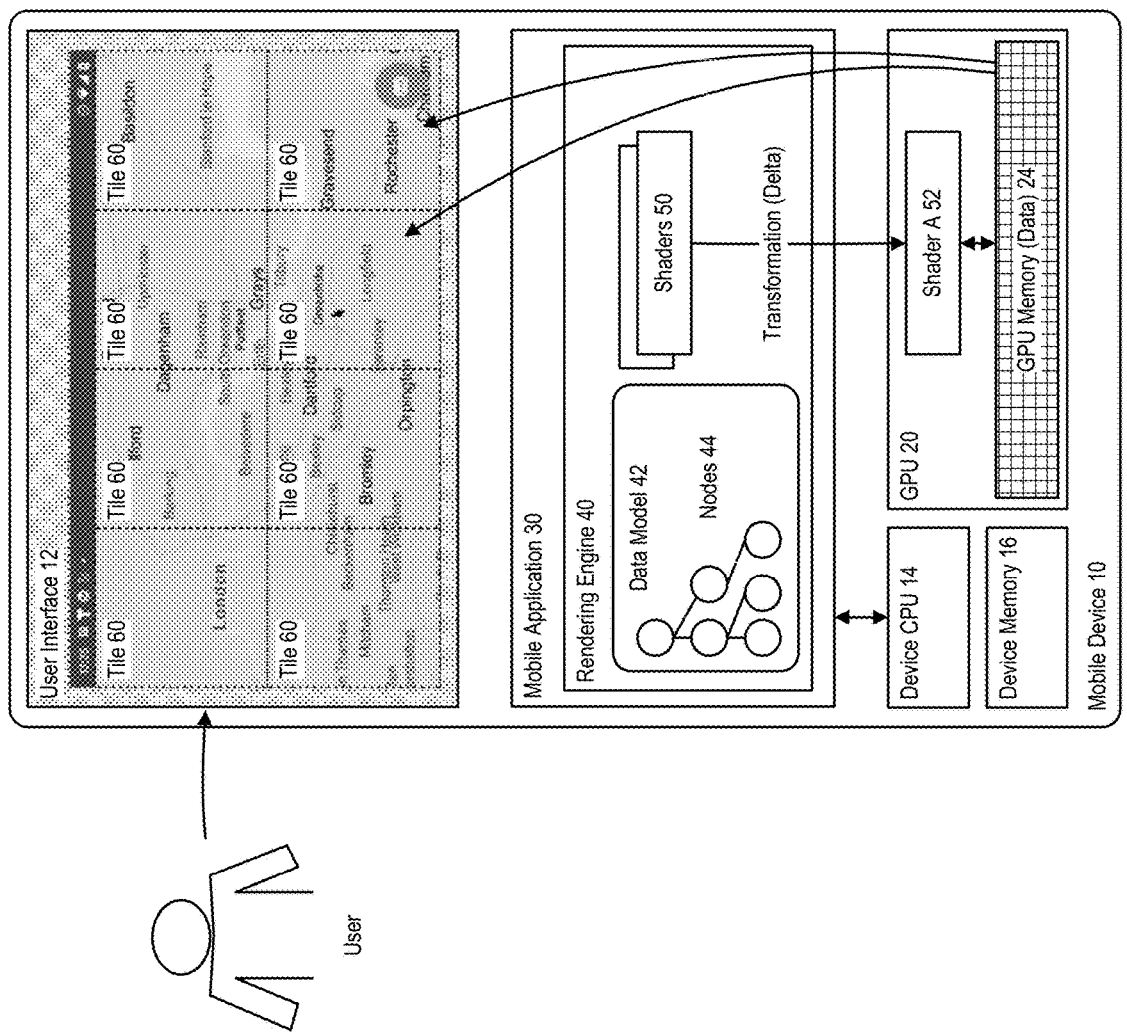
Figure 13:
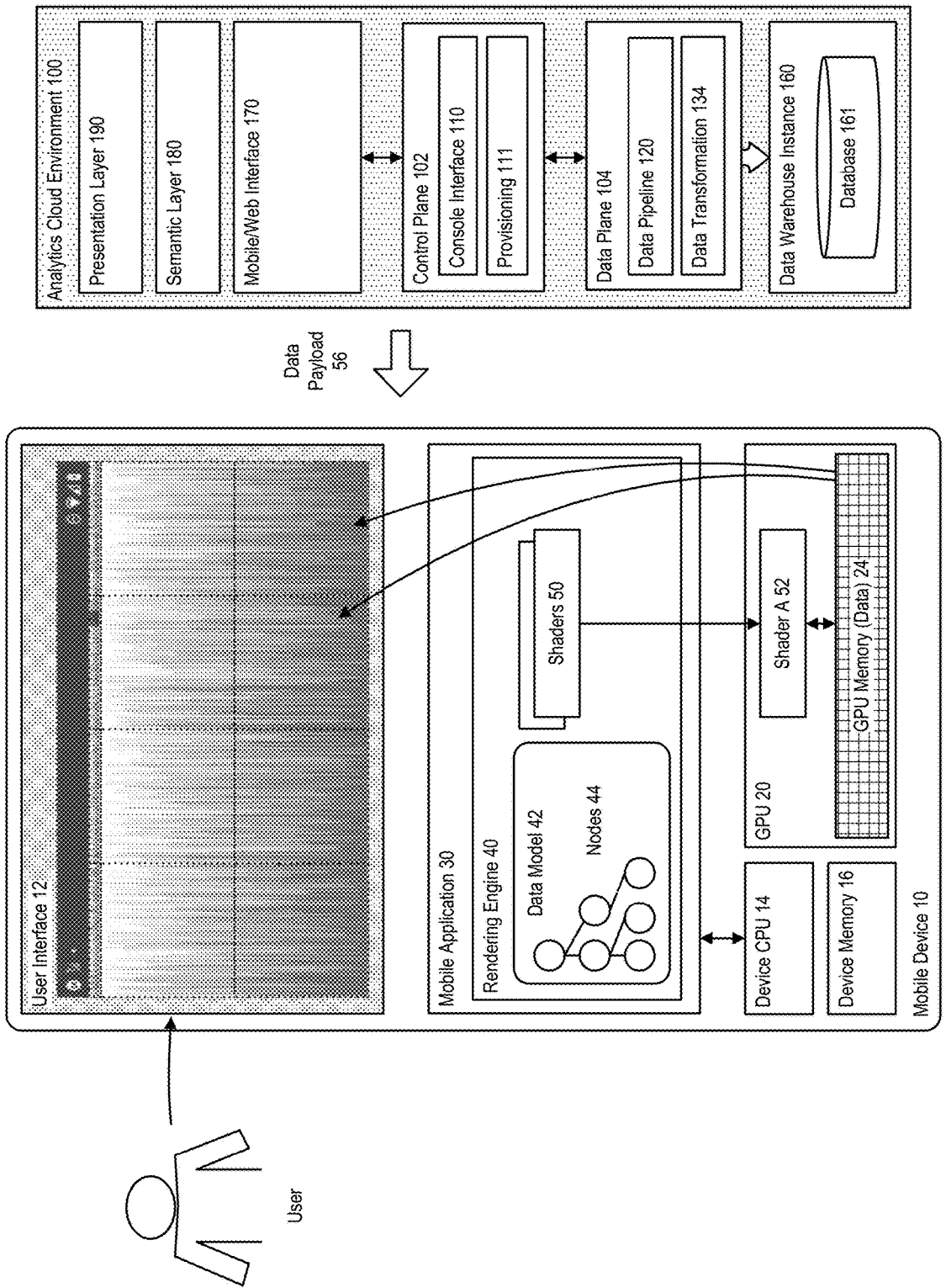
FIG. 13 illustrates another example use of a mobile device and application that includes a rendering engine, to access a data analytics or analytics cloud environment, in accordance with an embodiment.
Figure 14:
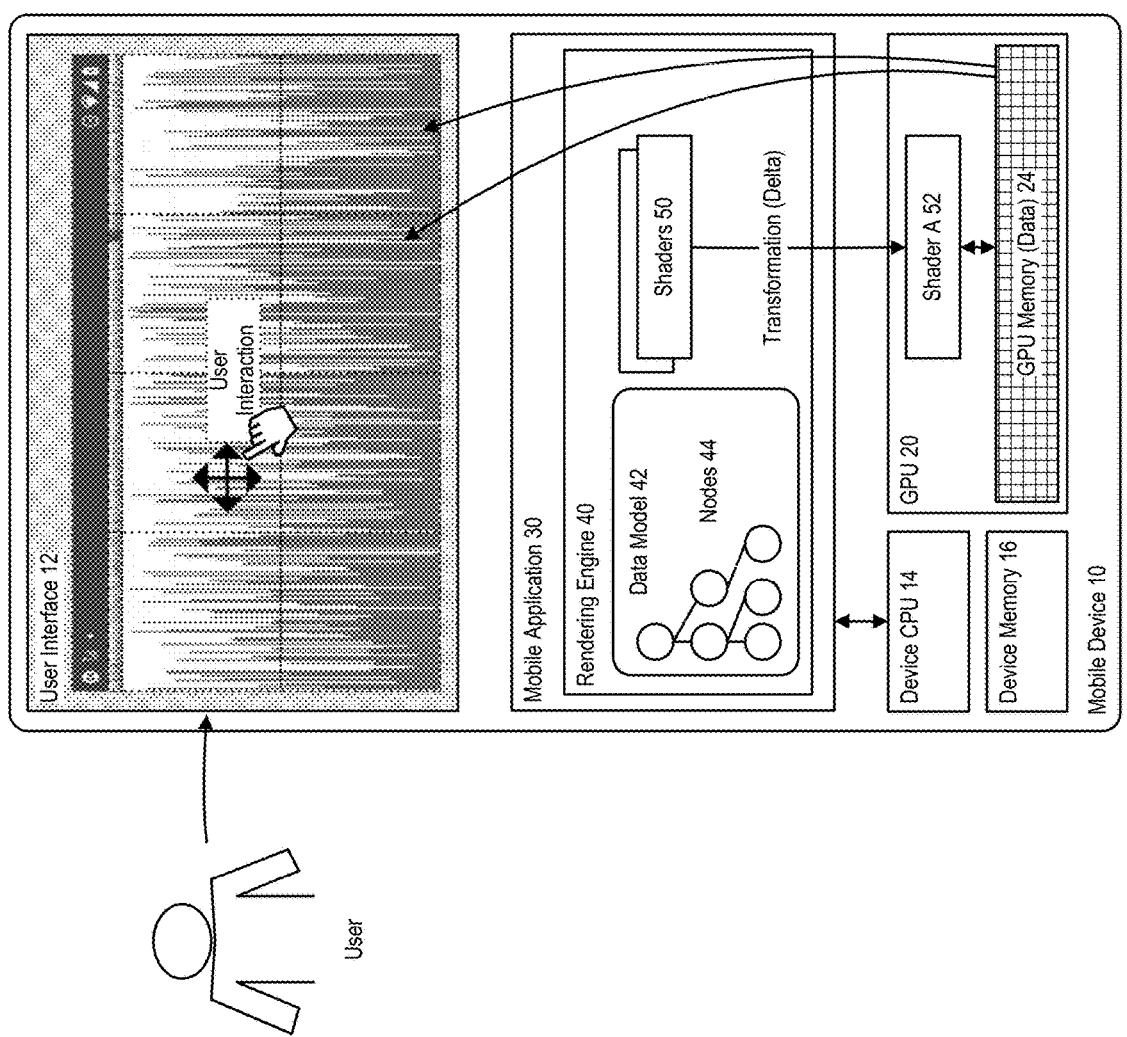
FIG. 14 further illustrates another example use of a mobile device and application that includes a rendering engine, to access a data analytics or analytics cloud environment, in accordance with an embodiment.
Figure 15:
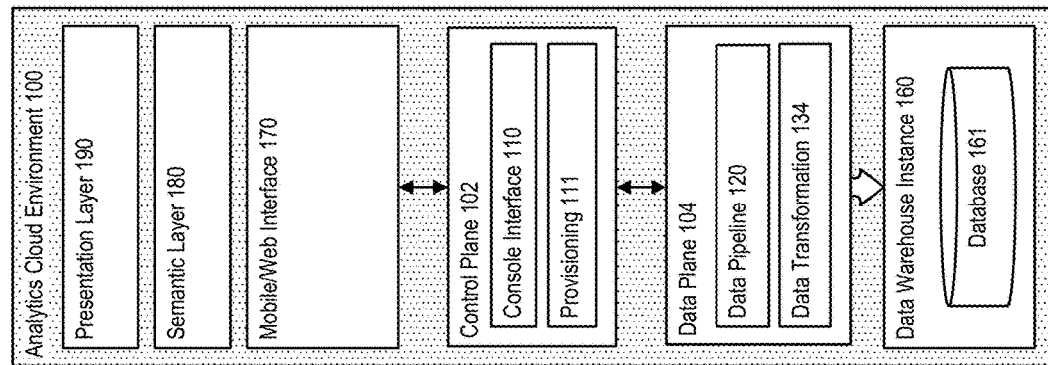
FIG. 15 further illustrates another example use of a mobile device and application that includes a rendering engine, to access a data analytics or analytics cloud environment, in accordance with an embodiment.
Figure 15:
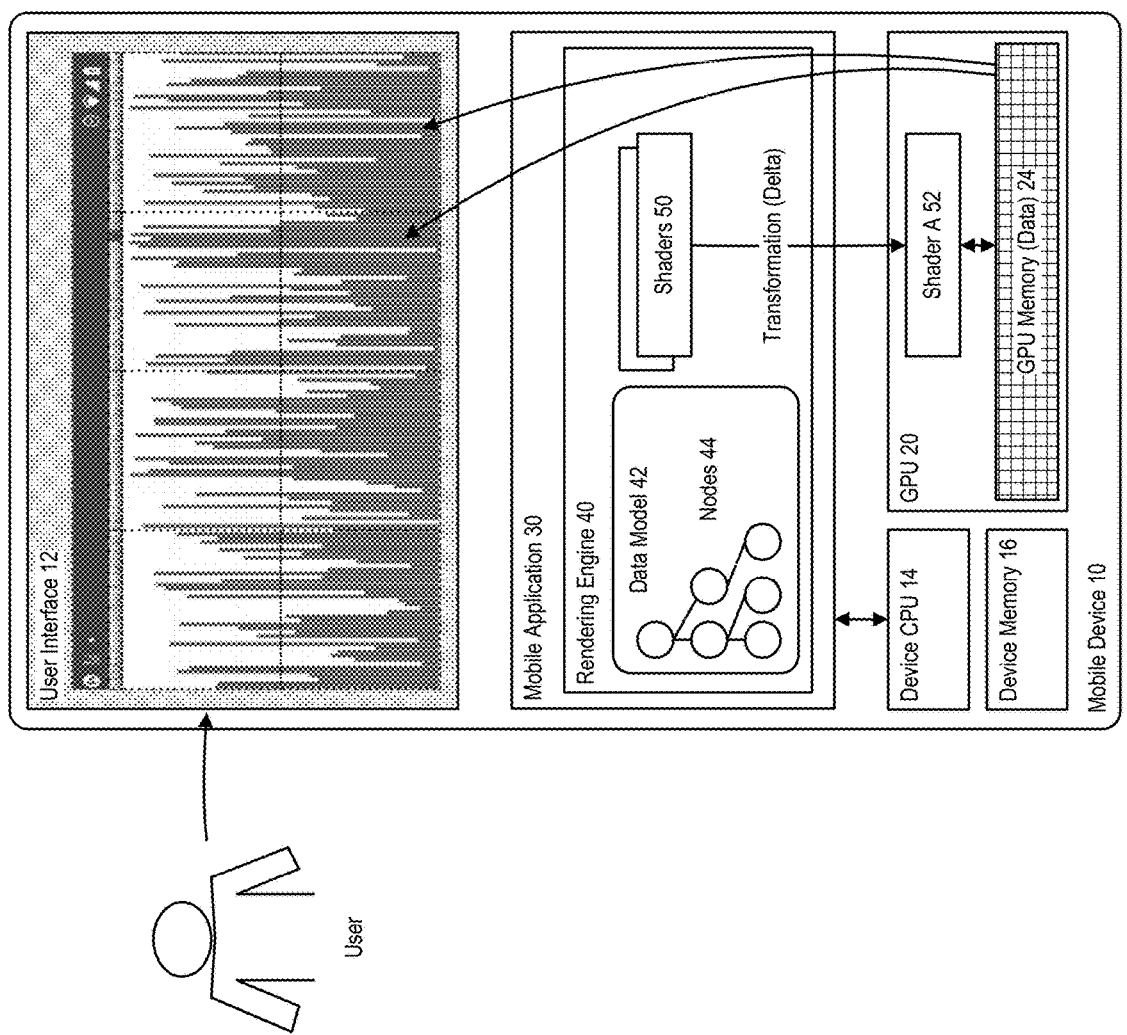
Figure 16:
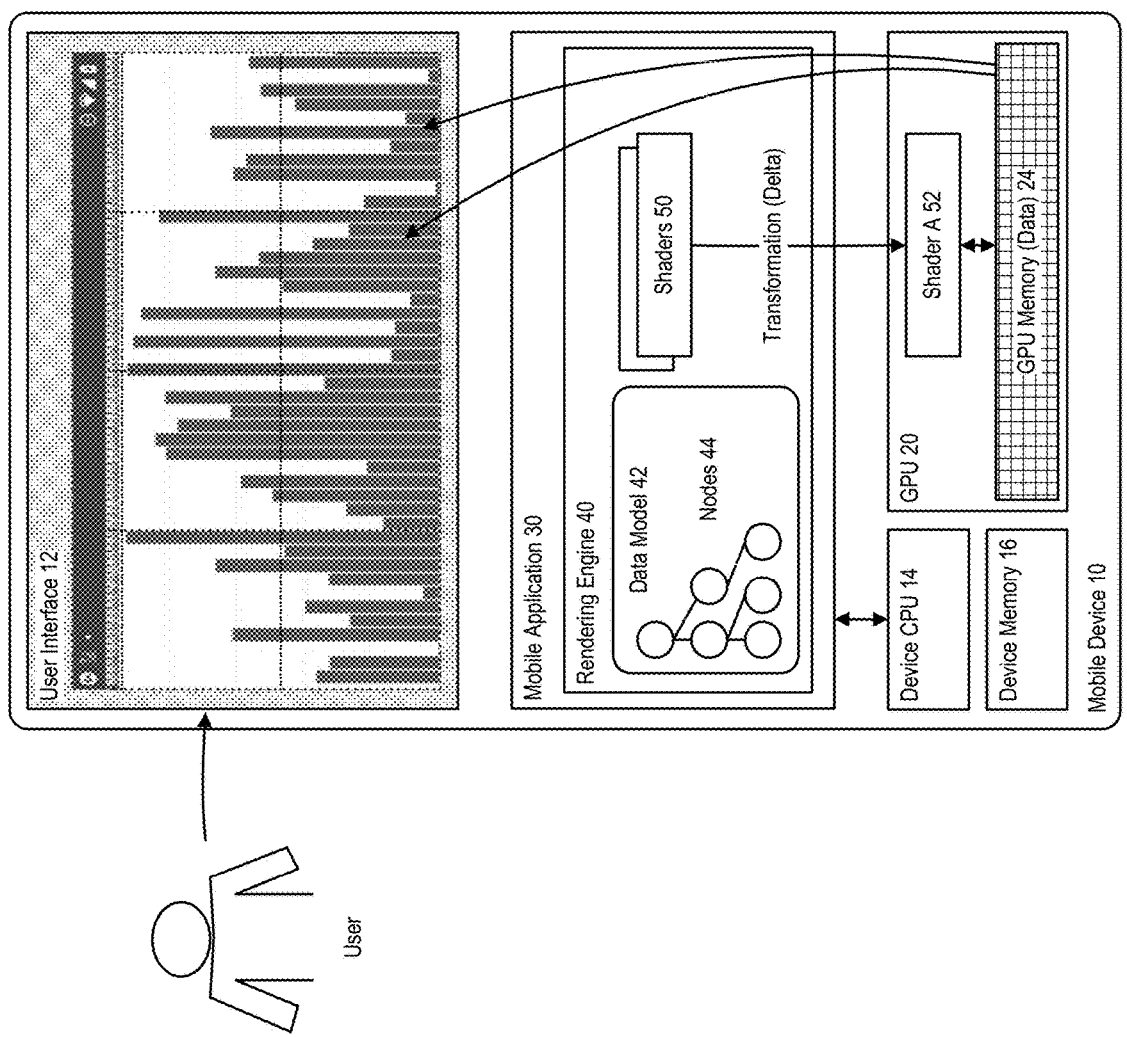
FIG. 16 further illustrates another example use of a mobile device and application that includes a rendering engine, to access a data analytics or analytics cloud environment, in accordance with an embodiment.
Figure 17:
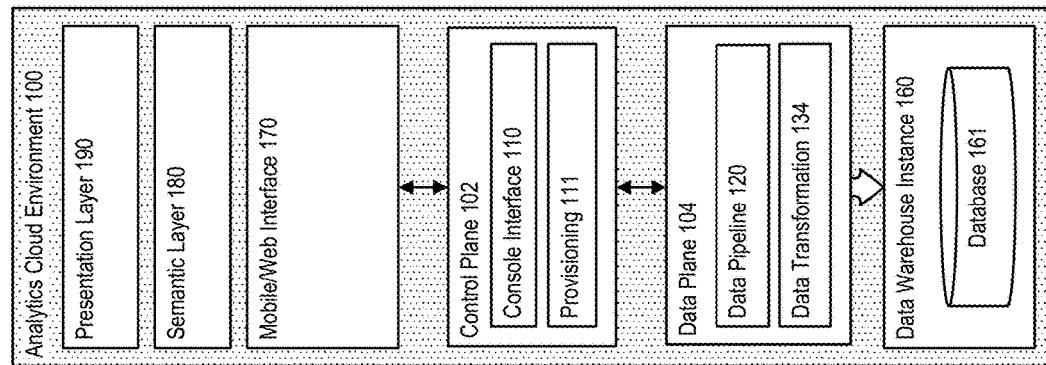
FIG. 17 further illustrates another example use of a mobile device and application that includes a rendering engine, to access a data analytics or analytics cloud environment, in accordance with an embodiment.
Figure 17:
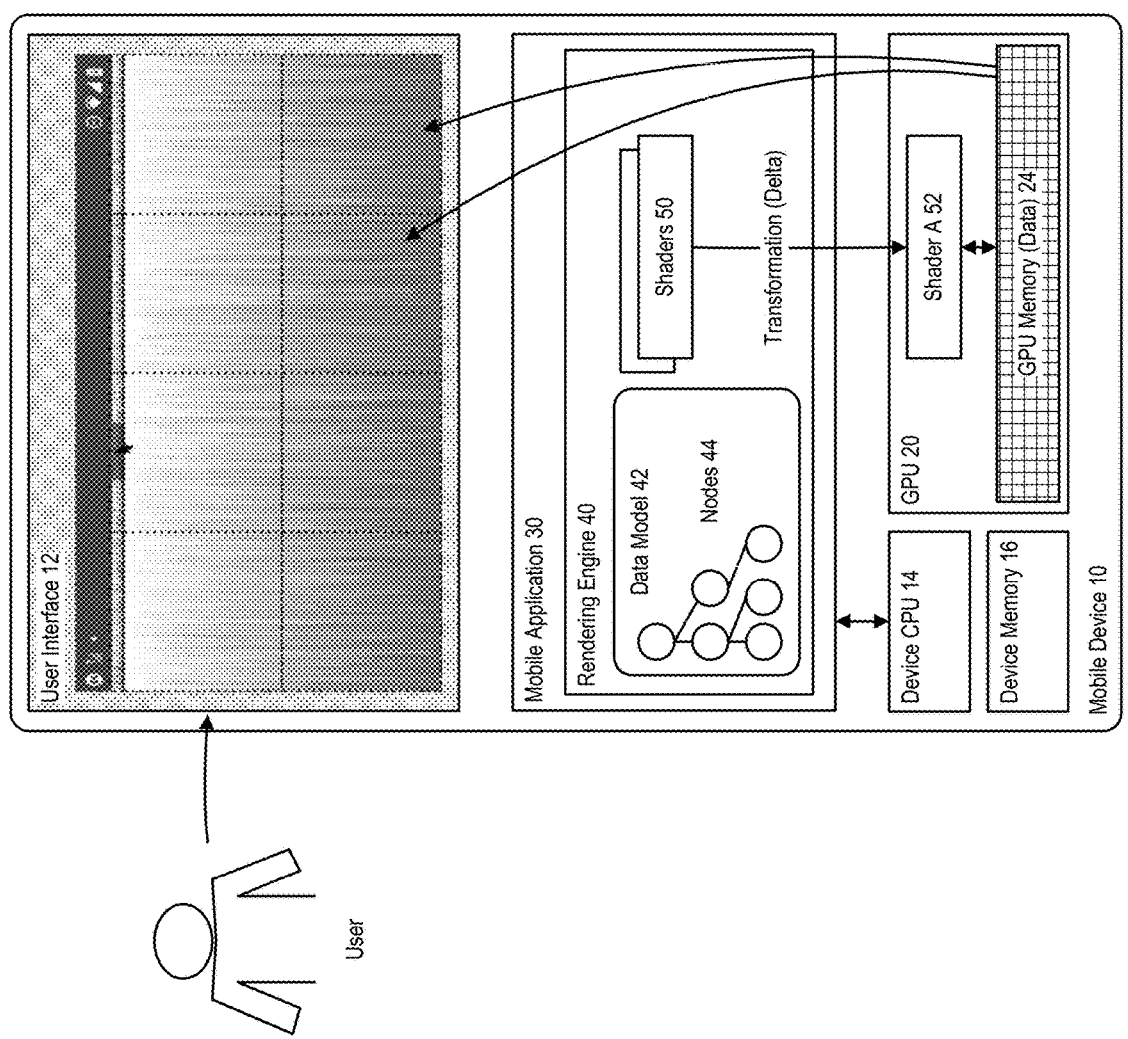
Figure 18:
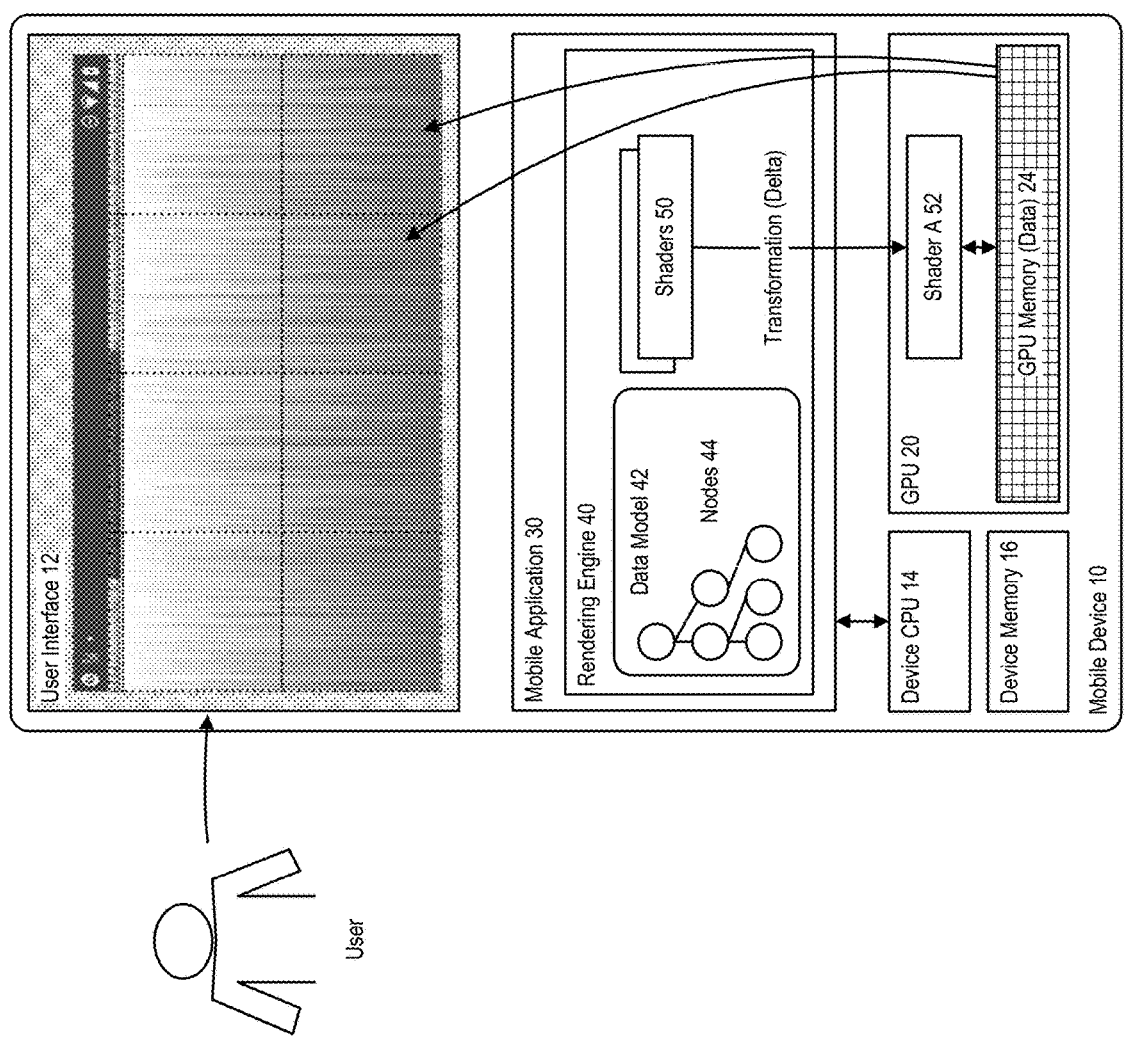
FIG. 18 further illustrates another example use of a mobile device and application that includes a rendering engine, to access a data analytics or analytics cloud environment, in accordance with an embodiment.

As illustrated in FIG. 8, in accordance with an embodiment, the rendering engine uses the shader together with the data payload as stored in the GPU and the transformation or delta, to update a visualization frame for display at the user interface, responsive to the interaction. The mobile device can continue to receive interactions with the displayed visualization, and wherein the rendering engine uses the shader together with the data payload as stored in the GPU, to continue to update the visualization frame for display at the user interface.

FIGS. 9-12 illustrate an example use of a mobile device and application that includes a rendering engine, to access a data analytics or analytics cloud environment, in accordance with an embodiment.

As illustrated in FIGS. 9-12, in accordance with an embodiment, the above-described techniques can be used, for example, with a map visualization, that can be drilled-down or panned to increasing levels of detail, while retaining a high frame rate.

FIGS. 13-18 illustrate another example use of a mobile device and application that includes a rendering engine, to access a data analytics or analytics cloud environment, in accordance with an embodiment.

As illustrated in FIGS. 13-18, in accordance with an embodiment, in accordance with an embodiment, the above-described techniques can be used, for example, with a bar chart visualization, that can be similarly frilled-down or panned to increasing levels of detail, while retaining a high frame rate.

Figure 19:
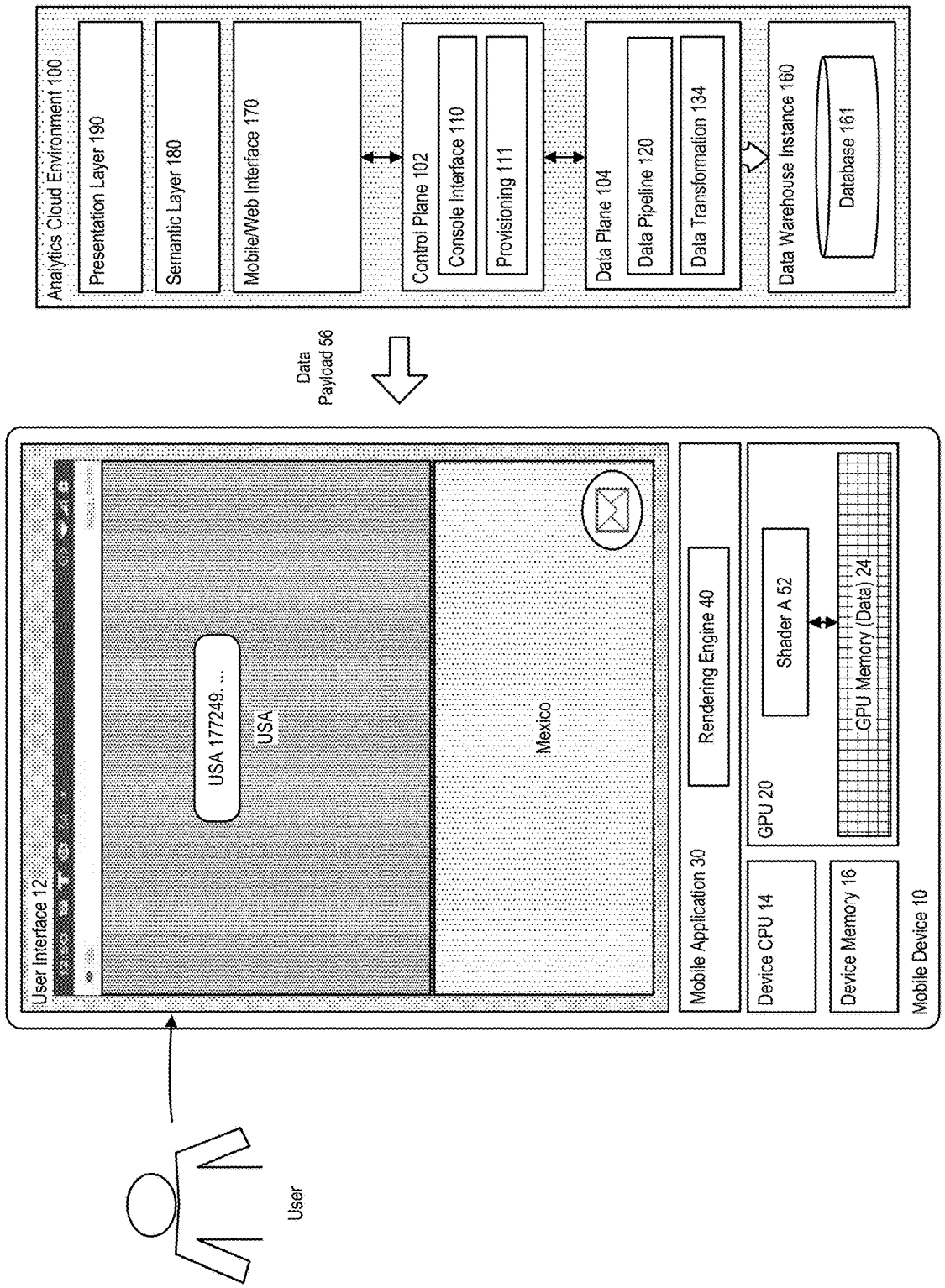
FIG. 19 illustrates another example use of a mobile device and application that includes a rendering engine, to access a data analytics or analytics cloud environment, in accordance with an embodiment.
Figure 20:
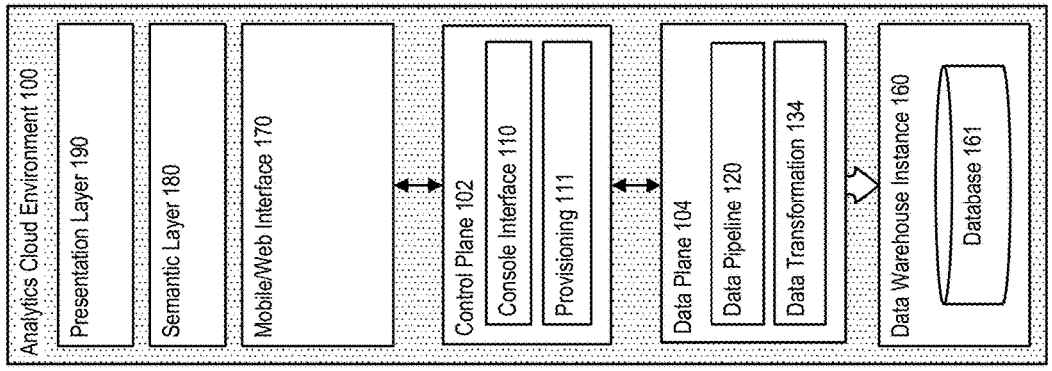
FIG. 20 further illustrates another example use of a mobile device and application that includes a rendering engine, to access a data analytics or analytics cloud environment, in accordance with an embodiment.
Figure 20:
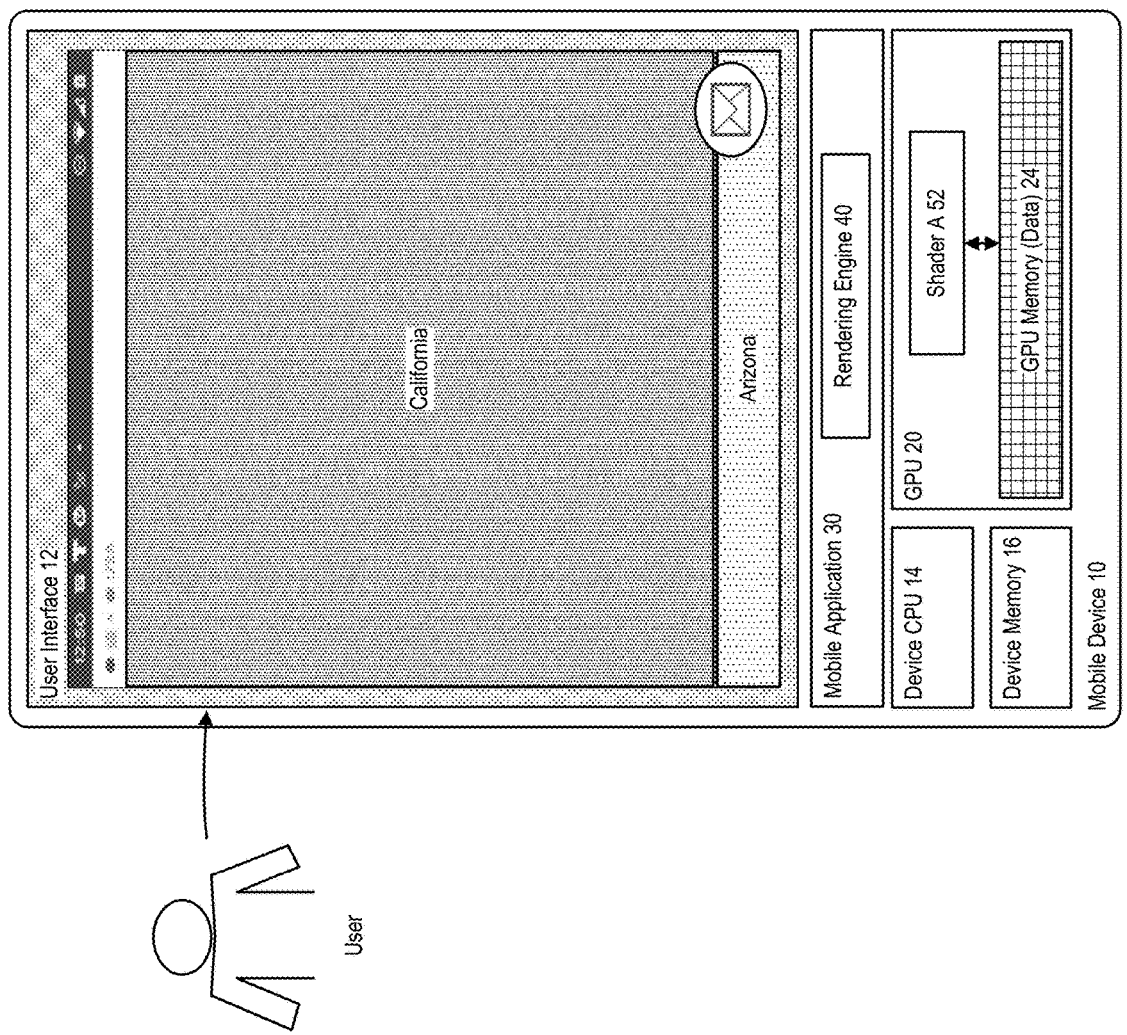
Figure 21:
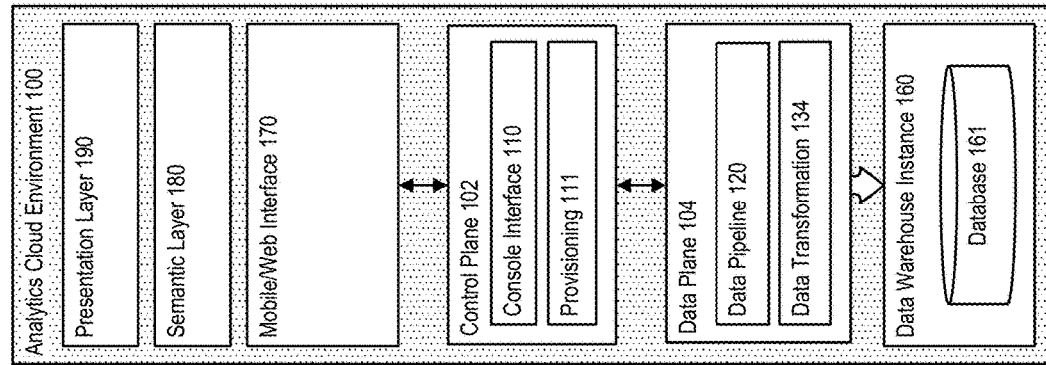
FIG. 21 further illustrates another example use of a mobile device and application that includes a rendering engine, to access a data analytics or analytics cloud environment, in accordance with an embodiment.
Figure 21:
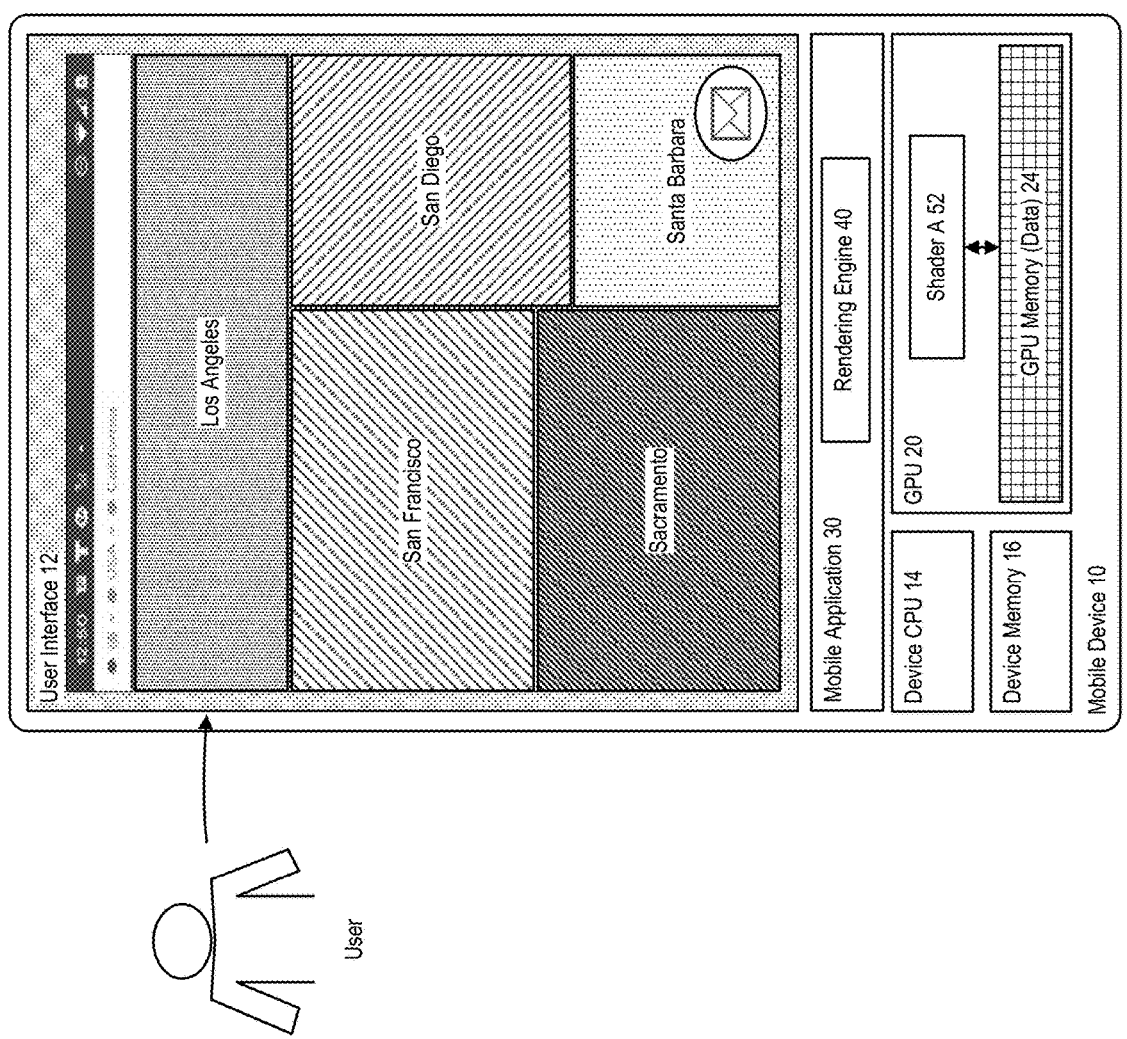

FIGS. 19-21 illustrate another example use of a mobile device and application that includes a rendering engine, to access a data analytics or analytics cloud environment, in accordance with an embodiment.

As illustrated in FIGS. 19-21, in accordance with an embodiment, in accordance with an embodiment, in accordance with an embodiment, the above-described techniques can be used, for example, with a geography (country/state) visualization, that can be similarly frilled-down or panned to increasing levels of detail, while retaining a high frame rate.

Figure 22:
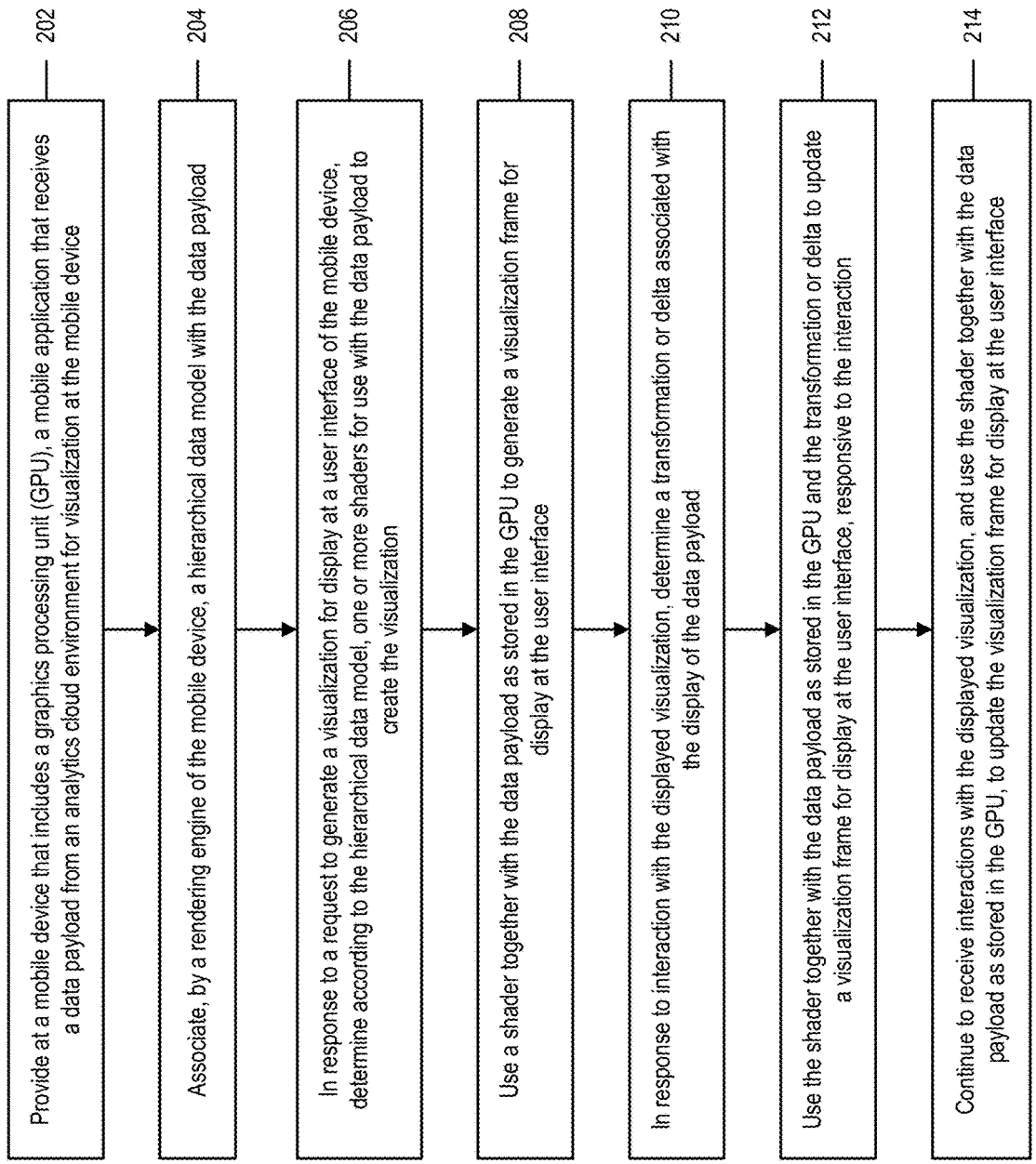
FIG. 22 illustrates a process for use of a mobile device and application that includes a rendering engine, to access a data analytics or analytics cloud environment, in accordance with an embodiment.

FIG. 22 illustrates a process for use of a mobile device and application that includes a rendering engine, to access a data analytics or analytics cloud environment, in accordance with an embodiment.

As illustrated in FIG. 22, in accordance with an embodiment, at step 202, a mobile device is provided that includes a graphics processing unit (GPU), and a mobile application that receives a data payload from an analytics cloud environment for visualization at the mobile device.

At step 204, a rendering engine of the mobile device associates a hierarchical data model with the data payload.

At step 206, in response to a request to generate a visualization for display at a user interface of the mobile device, the rendering engine determines according to the hierarchical data model, one or more shaders for use with the data payload to create the visualization.

At step 208, a shader is used together with the data payload as stored in the GPU to generate a visualization frame for display at the user interface.

At step 210, in response to interaction with the displayed visualization, the rendering engine can determine a transformation or delta associated with the display of the data payload.

At step 212, the rendering engine uses the shader together with the data payload as stored in the GPU and the transformation or delta, to update a visualization frame for display at the user interface, responsive to the interaction.

At step 214, the mobile device can continue to receive interactions with the displayed visualization, and wherein the rendering engine uses the shader together with the data payload as stored in the GPU, to continue to update the visualization frame for display at the user interface.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

For example, although several of the examples provided herein illustrate operation of a data analytics environment with an enterprise software application or data environment such as, for example, an Oracle Fusion Applications environment; or within the context of a software-as-a-service (SaaS) or cloud environment such as, for example, an Oracle Analytics Cloud or Oracle Cloud Infrastructure environment; in accordance with various embodiments, the systems and methods described herein can be used with other types of enterprise software application or data environments, cloud environments, cloud services, cloud computing, or other computing environments.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for providing a mobile device application with a high-performance rendering engine for use with data analytics, comprising:
   a mobile device that includes a graphics processing unit (GPU) and mobile application adapted to receive from a data analytics server, a data payload describing data associated with data analytics visualizations, wherein the server comprises data objects having dimensions associated therewith; and
   a rendering engine that generates interactive visualizations of the data using shaders and the device GPU, including wherein:
      each visualization type is associated with an associated shader that is called to render and/or update tiles associated with a visualization generated thereby;
      upon receipt of the data payload from the server, the rendering engine in response to a request to generate a visualization of a data payload, for display at a user interface of the mobile device, determines one or more shaders for use with the data payload to create a requested visualization, and passes a model associated with the data payload, to its associated shader, to populate the visualization;
      wherein interactions with a visualization are transformed and communicated to a shader and the GPU to render an updated visualization, including that user interaction with a visualization is interpreted by the rendering engine as transformations or deltas of an original presentation of the visualization, and communicated to the associated shader to cause the GPU to render an updated visualization.

2. The system of claim 1, wherein the mobile device is adapted to receive the data payload from an analytics cloud environment for visualization at the mobile device;
   wherein the data received from the server as the data payload is stored in a first data structure, with a visualization associated with the data stored in a second data structure;
   wherein the rendering engine of the mobile device associates a hierarchical data model having nodes with the data payload, including that the hierarchical data model supports drill-down to nodes of different dimensions associated with the data, wherein the rendering engine determines according to the hierarchical data model, the shaders for use with the data payload to create the visualization.

3. The system of claim 2, wherein a user interaction with a visualization is interpreted by the rendering engine as transformations or deltas of an original presentation, and communicated to a shader to cause the GPU to render an updated visualization.

4. The system of claim 3, wherein each interaction that results in a transformation is passed to the shader and GPU to update the data visualization on the render call, without needing to re-fetch the data itself from the analytics cloud environment.

5. The system of claim 1, wherein the data analytics server provides a customer with a customer schema, wherein a provisioning component operates to provision a data warehouse instance including the customer schema, and populate the data warehouse instance, for use with the mobile device application in rendering data analytics.

6. The system of claim 5, wherein the data analytics server comprises a data pipeline and data transformation layer that together process operational or transactional data, which are then load as a transformed data into the data warehouse instance, for use with the mobile device application in rendering data analytics.

7. A method for providing a mobile device application with a high-performance rendering engine for use with data analytics, comprising:
   providing, at a mobile device that includes a graphics processing unit (GPU), a mobile application adapted to receive from a data analytics server, a data payload describing data associated with data analytics visualizations, wherein the server comprises data objects having dimensions associated therewith; and
   generating, by a rendering engine, interactive visualizations of the data using shaders and the device GPU, including wherein:
      each visualization type is associated with an associated shader that is called to render and/or update tiles associated with a visualization generated thereby;
      upon receipt of the data payload from the server, the rendering engine in response to a request to generate a visualization of a data payload, for display at a user interface of the mobile device, determines one or more shaders for use with the data payload to create a requested visualization, and passes a model associated with the data payload, to its associated shader, to populate the visualization;

wherein interactions with a visualization are transformed and communicated to a shader and the GPU to render an updated visualization, including that user interaction with a visualization is interpreted by the rendering engine as transformations or deltas of an original presentation of the visualization, and communicated to the associated shader to cause the GPU to render an updated visualization.

8. The method of claim 7, wherein the mobile device is adapted to receive the data payload from an analytics cloud environment for visualization at the mobile device;

wherein the data received from the server as the data payload is stored in a first data structure, with a visualization associated with the data stored in a second data structure;

wherein the rendering engine of the mobile device associates a hierarchical data model having nodes with the data payload, including that the hierarchical data model supports drill-down to nodes of different dimensions associated with the data, wherein the rendering engine determines according to the hierarchical data model, the shaders for use with the data payload to create the visualization.

9. The method of claim 8, wherein a user interaction with a visualization is interpreted by the rendering engine as transformations or deltas of an original presentation, and communicated to a shader to cause the GPU to render an updated visualization.

10. The method of claim 9, wherein each interaction that results in a transformation is passed to the shader and GPU to update the data visualization on the render call, without needing to re-fetch the data itself from the analytics cloud environment.

11. The method of claim 7, wherein the data analytics server provides a customer with a customer schema, wherein a provisioning component operates to provision a data warehouse instance including the customer schema, and populate the data warehouse instance, for use with the mobile device application in rendering data analytics.

12. The method of claim 11, wherein the data analytics server comprises a data pipeline and data transformation layer that together process operational or transactional data, which are then load as a transformed data into the data warehouse instance, for use with the mobile device application in rendering data analytics.

13. A non-transitory computer readable storage medium having instructions thereon, which when read and executed by a mobile device that includes a graphics processing unit (GPU), causes the mobile device to perform a method comprising:

receiving, at a mobile application, from a data analytics server, a data payload describing data associated with data analytics visualizations, wherein the server comprises data objects having dimensions associated therewith; and generating, by a rendering engine, interactive visualizations of the data using shaders and the device GPU, including wherein:

each visualization type is associated with an associated shader that is called to render and/or update tiles associated with a visualization generated thereby;

upon receipt of the data payload from the server, the rendering engine in response to a request to generate a visualization of a data payload, for display at a user interface of the mobile device, determines one or more shaders for use with the data payload to create a requested visualization, and passes a model associated with the data payload, to its associated shader, to populate the visualization;

wherein interactions with a visualization are transformed and communicated to a shader and the GPU to render an updated visualization, including that user interaction with a visualization is interpreted by the rendering engine as transformations or deltas of an original presentation of the visualization, and communicated to the associated shader to cause the GPU to render an updated visualization.

14. The non-transitory computer readable storage medium of claim 13, wherein the mobile device is adapted to receive the data payload from an analytics cloud environment for visualization at the mobile device;

wherein the data received from the server as the data payload is stored in a first data structure, with a visualization associated with the data stored in a second data structure;

wherein the rendering engine of the mobile device associates a hierarchical data model having nodes with the data payload, including that the hierarchical data model supports drill-down to nodes of different dimensions associated with the data, wherein the rendering engine determines according to the hierarchical data model, the shaders for use with the data payload to create the visualization.

15. The non-transitory computer readable storage medium of claim 14, wherein a user interaction with a visualization is interpreted by the rendering engine as transformations or deltas of an original presentation, and communicated to a shader to cause the GPU to render an updated visualization.

16. The non-transitory computer readable storage medium of claim 15, wherein each interaction that results in a transformation is passed to the shader and GPU to update the data visualization on the render call, without needing to re-fetch the data itself from the analytics cloud environment.

17. The non-transitory computer readable storage medium of claim 13, wherein the data analytics server provides a customer with a customer schema, wherein a provisioning component operates to provision a data warehouse instance including the customer schema, and populate the data warehouse instance, for use with the mobile device application in rendering data analytics.

18. The non-transitory computer readable storage medium of claim 17, wherein the data analytics server comprises a data pipeline and data transformation layer that together process operational or transactional data, which are then load as a transformed data into the data warehouse instance, for use with the mobile device application in rendering data analytics.

* * * * *